United States Patent
Ishizeki et al.

(10) Patent No.: US 9,831,813 B2
(45) Date of Patent: Nov. 28, 2017

(54) MOTOR DRIVING APPARATUS

(71) Applicant: DAIKIN INDUSTRIES, LTD., Osaka-shi, Osaka (JP)

(72) Inventors: Shinichi Ishizeki, Sakai (JP); Yasushi Kurosawa, Sakai (JP); Kentaroh Taoka, Sakai (JP)

(73) Assignee: Daikin Industries, Ltd., Osaka (JP)

(*) Notice: Subject to any disclaimer, the term of this patent is extended or adjusted under 35 U.S.C. 154(b) by 0 days.

(21) Appl. No.: 14/892,494

(22) PCT Filed: May 20, 2014

(86) PCT No.: PCT/JP2014/063278
§ 371 (c)(1),
(2) Date: Nov. 19, 2015

(87) PCT Pub. No.: WO2014/189022
PCT Pub. Date: Nov. 27, 2014

(65) Prior Publication Data
US 2016/0118924 A1    Apr. 28, 2016

(30) Foreign Application Priority Data

May 20, 2013 (JP) .................................. 2013-105870

(51) Int. Cl.
*H02P 27/00* (2006.01)
*H02P 27/06* (2006.01)
(Continued)

(52) U.S. Cl.
CPC ............ *H02P 27/06* (2013.01); *H02M 3/158* (2013.01); *H02P 6/001* (2013.01); *H02P 27/04* (2013.01)

(58) Field of Classification Search
CPC ............... Y02T 10/7005; Y02T 10/645; Y02T 10/7241; Y02T 10/7225; B60L 2210/14
See application file for complete search history.

(56) References Cited

U.S. PATENT DOCUMENTS

2009/0128117 A1* 5/2009 Ochiai ................ B60L 11/1851
323/299
2011/0025248 A1* 2/2011 Jang .................... H02M 3/1584
318/521
(Continued)

FOREIGN PATENT DOCUMENTS

CN          101999200 A      3/2011
JP          62-58871 A       3/1987
(Continued)

OTHER PUBLICATIONS

Translation of JP2001231262 has been attached.*
(Continued)

*Primary Examiner* — Kawing Chan
*Assistant Examiner* — Zoheb Imtiaz
(74) *Attorney, Agent, or Firm* — Global IP Counselors, LLP

(57) ABSTRACT

A motor driving apparatus includes a boosting section, a drive voltage output section, a detecting section, a storage section and a determining section. The boosting section generates a post-boosting voltage by boosting an input voltage. The drive voltage output section generates a drive voltage to drive a motor using the post-boosting voltage. The detecting section detects a value of the input voltage or a variation width relative to a reference value of the input voltage as variation power source variation information when there is power source variation. The storage section stores target value association information associating the power source variation information and a boosting target value of the post-boosting voltage. The determining section determines the boosting target value based on the power source variation information and target value association information. The target value association information is
(Continued)

determined based on a range of operations of the drive voltage output section.

16 Claims, 10 Drawing Sheets

(51) Int. Cl.
    *H02P 27/04* (2016.01)
    *H02P 6/00* (2016.01)
    *H02M 3/158* (2006.01)

(56) References Cited

U.S. PATENT DOCUMENTS

| | | | |
|---|---|---|---|
| 2013/0293161 A1* | 11/2013 | Al Dibs | H02P 13/00 318/116 |
| 2014/0042839 A1* | 2/2014 | Horie | H02M 1/32 310/50 |
| 2014/0217941 A1* | 8/2014 | Yamada | B60L 15/02 318/400.26 |

FOREIGN PATENT DOCUMENTS

| | | | |
|---|---|---|---|
| JP | 10-210784 | A | 8/1998 |
| JP | 2000-14153 | A | 1/2000 |
| JP | 2001-231262 | A | 8/2001 |
| JP | 2001231262 | * | 8/2001 |
| JP | 2008-72779 | A | 3/2008 |
| JP | 2008072779 | * | 3/2008 |
| JP | 2010-268626 | A | 11/2010 |
| JP | 201026862 | * | 11/2010 |
| JP | 2010268626 | * | 11/2010 |
| WO | 2009/125265 | A2 | 10/2009 |

OTHER PUBLICATIONS

Translation of JP2008072779 has been attached.*
Translation of JP201026862 has been attached.*
International Preliminary Report of corresponding PCT Application No. PCT/JP2014/063278 dated Dec. 3, 2015.
The International Search Report of corresponding international application No. PCT/JP2014/063278, dated Aug. 5, 2014.
European Search Report of corresponding EP Application No. 14 80 1068.9 dated Jun. 20, 2016.

* cited by examiner

MOTOR DRIVING APPARATUS

CROSS-REFERENCE TO RELATED APPLICATIONS

This U.S. National stage application claims priority under 35 U.S.C. §119(a) to Japanese Patent Application No. 2013-105870, filed in Japan on May 20, 2013, the entire contents of which is hereby incorporated herein by reference.

TECHNICAL FIELD

The present invention relates to a motor driving apparatus.

BACKGROUND ART

A motor is often used as a drive source for a compressor, a fan, or the like which is included in an air conditioner. The motor is driven using a motor driving apparatus which includes an inverter or the like.

As the motor driving apparatus, a configuration using a rectifying section, a smoothing section, and an inverter is typically known. First, a power source voltage which is output from a commercial power source is rectified using the rectifying section. Next, in a case that the commercial power source is a single-phase power source, a boosting type of power factor improvement circuit is also used as a boosting section to a desired voltage using the boosting section. The voltage after being boosted is smoothed using the smoothing section and is supplied to the inverter. The inverter generates a voltage for driving the motor using the voltage which is supplied and outputs this voltage to the motor. Due to this, the motor is driven.

A technique which is expressed above, for example, Japanese Patent Unexamined Publication No. 2000-14153 is known as a technique which is related to the motor driving apparatus described above.

SUMMARY

Problems to be Solved by the Invention

In the commercial power source, there typically is variation in the power source voltage. In addition, standard voltage values, which are reference values for the commercial power source in the various countries in the world, are different for each country.

In some boosting section, the value of the voltage which is output by the boosting section is always constant irrespective of the value of the voltage which is input into the boosting section even if, for example, the power source voltage varies.

However, there is a tendency for the value of the voltage which is input into the boosting section to be lower if the value of the power source voltage is lower than a reference value due to, for example, variation in the power source voltage. In this case, the amount of boosting where the boosting section boosts the voltage becomes larger than in a case where the value of the power source voltage is the reference value. With this, a large current flows in accompaniment with the amount of boosting in components which configure the boosting section. For this reason, there is a concern that the amount of heat generated in the components which configure the boosting section becomes large and consequently the components become faulty.

As a countermeasure for this, a technique is considered where components, which have a standard value such that a large current is also tolerable, are selected as the components which configure the boosting section. However, this technique results in the components increasing in size.

Therefore, the problem of the present invention is, without using larger components as components which configure a boosting section, to suppress the amount of heat generated in the components when variation in the power source voltage is generated.

Means to Solve the Problems

A motor driving apparatus according to a first aspect of the present invention is provided with a boosting section, a drive voltage output section, a power source variation information detecting section, a storage section, and a determining section. The boosting section is applied with a voltage which relates to a power source voltage as an input voltage and generates a post-boosting voltage by boosting the input voltage. The drive voltage output section generates a drive voltage using the post-boosting voltage and outputs the drive voltage to a motor. The drive voltage is a voltage for driving the motor. The power source variation information detecting section detects power source variation information. The power source variation information is a value of the input voltage or the variation width with regard to a reference value for the input voltage in a case where there is power source variation. The storage section stores target value association information. The target value association information is information which associates a boosting target value and the power source variation information. The boosting target value is a target value for the post-boosting voltage which is to be generated by the boosting section. The determining section determines the boosting target value based on the target value association information and the power source variation information which is detected. Then, the target value association information is determined based on the range of operations of the drive voltage output section.

Here, the value of the post-boosting voltage which is generated using the boosting section is determined according to the value of the input voltage and the target value association information or the variation width with regard to the reference value for the input voltage and the target value association information for each point in time. In particular, since the target value association information is determined based on the range of operations of the drive voltage output section, the value of the post-boosting voltage is a value to be, for example, within the range of operations of the drive voltage output section. Due to this, it is possible for the amount of boosting of the voltage using the boosting section to be suppressed to an appropriate amount while ensuring that it is possible for the drive voltage output section to be reliably operated. That is, without using larger components as the components which configure the boosting section, it is possible to suppress the amount of heating generated in the components when variation in the power source voltage is generated. Accordingly, it is possible to achieve components which are smaller in size and lower in cost.

A motor driving apparatus according to a second aspect of the present invention is the motor driving apparatus according to the first aspect of the present invention where the target value association information is also determined based on a condition that the boosting target value is equal to or less than a standard voltage of electrical components which configure the motor driving apparatus.

Here, the target value association information is determined so as to satisfy not only the range of operations of the drive voltage output section but also the condition that the boosting target value is equal to or less than the standard voltages of electrical components which configure the motor driving apparatus. Accordingly, the voltage which is applied to the electrical components is suppressed to be equal to or less than the standard voltages even if there is variation in the power source voltage and variation in the value of the boosting target value. Accordingly, it is possible to prevent faults in the electrical components.

A motor driving apparatus according to a third aspect of the present invention is the motor driving apparatus according to the second aspect of the present invention where a smoothing capacitor is further provided. The smoothing capacitor is positioned on the output side of the boosting section and the input side of the drive voltage output section. The smoothing capacitor smooths the post-boosting voltage and supplies the post-boosting voltage to the drive voltage output section. The drive voltage output section includes a plurality of switching elements. The switching elements generate the drive voltage by on and off being performed. Then, at least one of the smoothing capacitor and the switching elements are included in the electrical components.

Electrical components which are positioned on the output side of the boosting section, in more detail, the smoothing capacitor and the switching elements in the drive voltage output section, are included in the electrical components described above.

In the motor driving apparatus according to the present invention, the boosting target value is determined according to the power source variation information, that is, the variation width with regard to the value of the input voltage or the reference value for the input voltage. With this, the post-boosting voltage which is generated by the boosting section increases and the durability of a functional section, which is positioned on a latter stage side of the boosting section, where the post-boosting voltage is to be applied, is a problem depending on the case. However, here, the boosting target value is determined to be equal to or less than the standard voltage of this functional section, that is, the electrical components which configure the functional section on the output side of the boosting section. Accordingly, it is possible to reliably prevent faults in the electrical components which are positioned on the output side of the boosting section even if the value of the post-boosting voltage changes due to changes in the boosting target value according to power source variation.

A motor driving apparatus according to a fourth aspect of the present invention is the motor driving apparatus according to any of the first aspect to the third aspect of the present invention where at least one of an upper limit value or a lower limit value of the boosting target value in the target value association information are determined according to the range of operations of the drive voltage output section.

Here, for example, the upper limit value and the lower limit value of the boosting target value are determined to be within the range of operation voltage of the drive voltage output section. Due to this, the post-boosting voltage which is applied to the drive voltage output section is reliably within the range of operation voltage of the drive voltage output section even if there is variation in the power source voltage.

A motor driving apparatus according to a fifth aspect of the present invention is the motor driving apparatus according to any of the first aspect to the fourth aspect of the present invention where the power source variation information detecting section performs an operation of detecting the power source variation information before driving of the motor is started. The determining section performs an operation of determining the boosting target value before driving of the motor is started.

Here, the boosting target value which is determined based on the power source variation information before activation of the motor, that is, the value of the input voltage or the variation width with regard to the reference value for the input voltage, is a voltage value which is to be achieved by boosting using the boosting section in practice after activation of the motor. Accordingly, the post-boosting voltage, which has a value which is determined before activation of the motor, is supplied to the drive voltage output section.

A motor driving apparatus according to a sixth aspect of the present invention is the motor driving apparatus according to any of the first aspect to the fifth aspect of the present invention where the power source variation information detecting section performs the operation of detecting the power source variation information while the motor is being driven. The determining section performs the operation of determining the boosting target value while the motor is being driven.

Here, the post-boosting voltage according to the power source variation information, that is, the value of the input voltage or the variation width with regard to the reference value for the input voltage is determined for each point in time after activation of the motor. Due to this, the voltage value which is to be achieved by boosting using the boosting section is a value which corresponds to real time variation in the power source voltage and the post-boosting voltage which has this value is supplied to the drive voltage output section. Accordingly, it is possible to more reliably ensure that it is possible for the drive voltage output section to be operated. And, it is also possible to more reliably suppress the amount of heating generated in the components which configure the boosting section since it is possible for the amount of boosting of the voltage using the boosting section to be suppressed to a more appropriate amount.

A motor driving apparatus according to a seventh aspect of the present invention is the motor driving apparatus according to any of the first aspect to the sixth aspect of the present invention where the determining section changes the boosting target value according to the power source variation information.

Due to this, the post-boosting voltage, which has a value which changes according to the power source variation information, that is, the value of the input voltage or the variation width with regard to the reference value for the input voltage, is supplied to the drive voltage output section. Accordingly, it is possible to more reliably ensure that it is possible for the drive voltage output section to be operated. And, it is also possible to more reliably suppress the amount of heating generated in the components which configure the boosting section since it is possible for the amount of boosting of the voltage using the boosting section to be suppressed to a more appropriate amount.

A motor driving apparatus according to an eighth aspect of the present invention is the motor driving apparatus according to the seventh aspect of the present invention where the power source variation information and the boosting target value are associated in the target value association information so that the boosting target value increases in units which are a predetermined value in accompaniment with increases in the value of the power source voltage.

For example, the boosting target value becomes higher as the value of the input voltage is higher due to the value of the power source voltage being high and the boosting target value becomes lower as the value of the input voltage is smaller due to the value of the power source voltage being lower. Accordingly, it is possible to reliably prevent the current which flows in the components which configure the boosting section from being large and consequently the amount of heat generated in the components which configure the boosting section from becoming large due to the boosting target value being high while the value of the power source voltage is low and the value of the input voltage is small.

Effects of the Invention

Using the motor driving apparatus according to the first aspect of the present invention, it is possible for the amount of boosting of the voltage using the boosting section to be suppressed to an appropriate amount while ensuring that it is possible for the drive voltage output section to be reliably operated even if there is variation in the power source voltage. That is, without using larger components as the components which configure the boosting section, it is possible to suppress the amount of heating generated in the components when variation in the power source voltage is generated. Accordingly, it is possible to achieve components which are smaller in size and lower in cost.

Using the motor driving apparatus according to the second aspect and third aspect of the present invention, it is possible to prevent faults in the electrical components.

Using the motor driving apparatus according to the fourth aspect of the present invention, the post-boosting voltage which is applied to the drive voltage output section is reliably within the range of operation voltage of the drive voltage output section even if there is variation in the power source voltage.

Using the motor driving apparatus according to the fifth aspect of the present invention, the post-boosting voltage, which has a value which is determined before activation of the motor, is supplied to the drive voltage output section.

Using the motor driving apparatus according to the sixth aspect and seventh aspect of the present invention, it is possible to more reliably ensure that it is possible for the drive voltage output section to be operated. And, it is also possible to more reliably suppress the amount of heating generated in the components which configure the boosting section since it is possible for the amount of boosting of the voltage using the boosting section to be suppressed to a more appropriate amount.

Using the motor driving apparatus according to the eighth aspect of the present invention, it is possible to, for example, reliably prevent the current which flows in the components which configure the boosting section from being large and consequently the amount of heat generated in the components which configure the boosting section from becoming large due to the boosting target value being high while the value of the power source voltage is low and the value of the input voltage is small.

DESCRIPTION OF EMBODIMENTS

A motor driving apparatus according to the present invention will be described in detail below with reference to the diagrams. Here, the following embodiment is a detailed example of the present invention and does not limit the scope of protection of the present invention.

(1) Concept and Configuration of Air Conditioner

Figure 1:
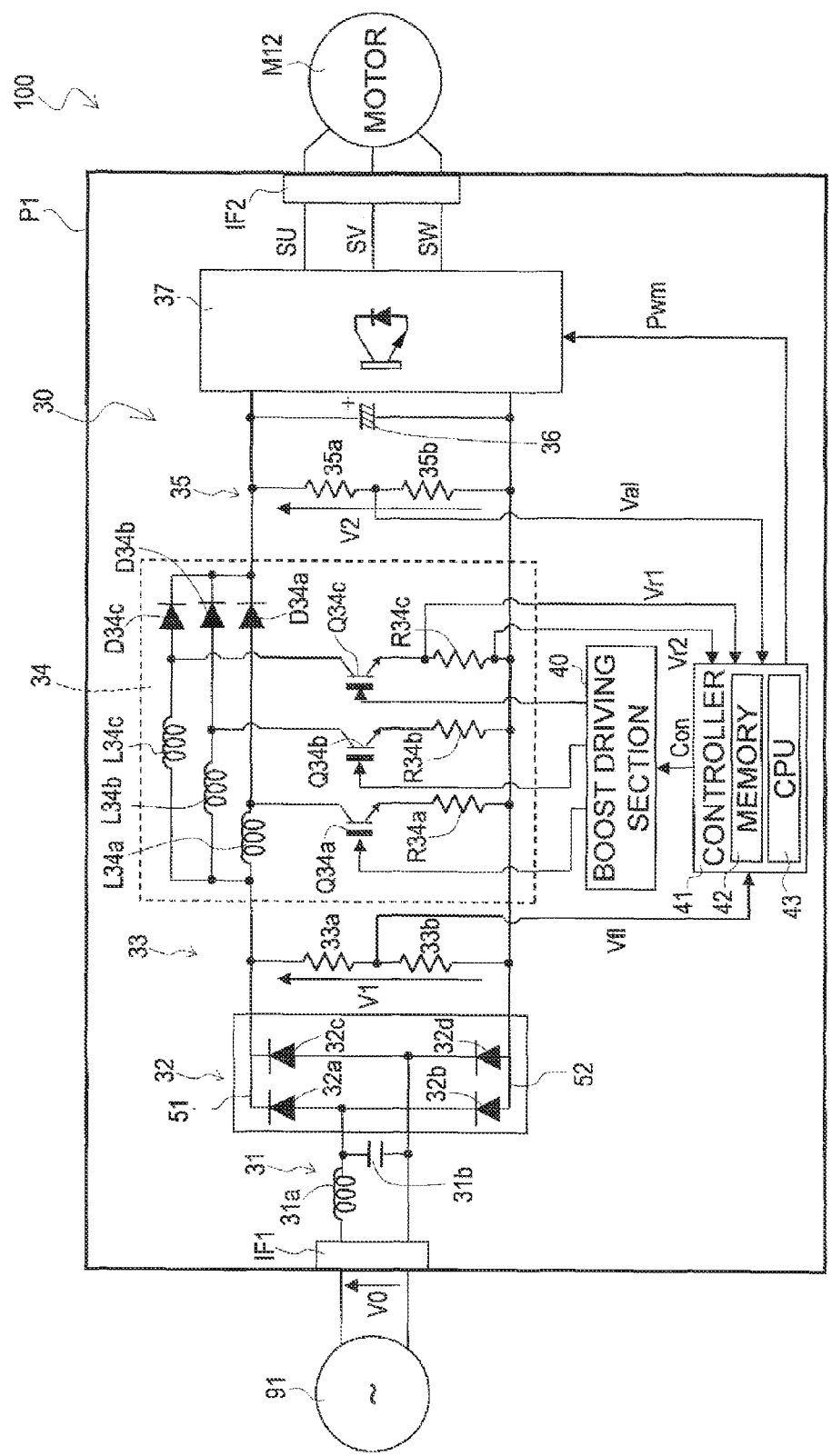
FIG. 1 is a configuration diagram of a motor driving system which includes a motor driving apparatus according to an embodiment.
Figure 2:
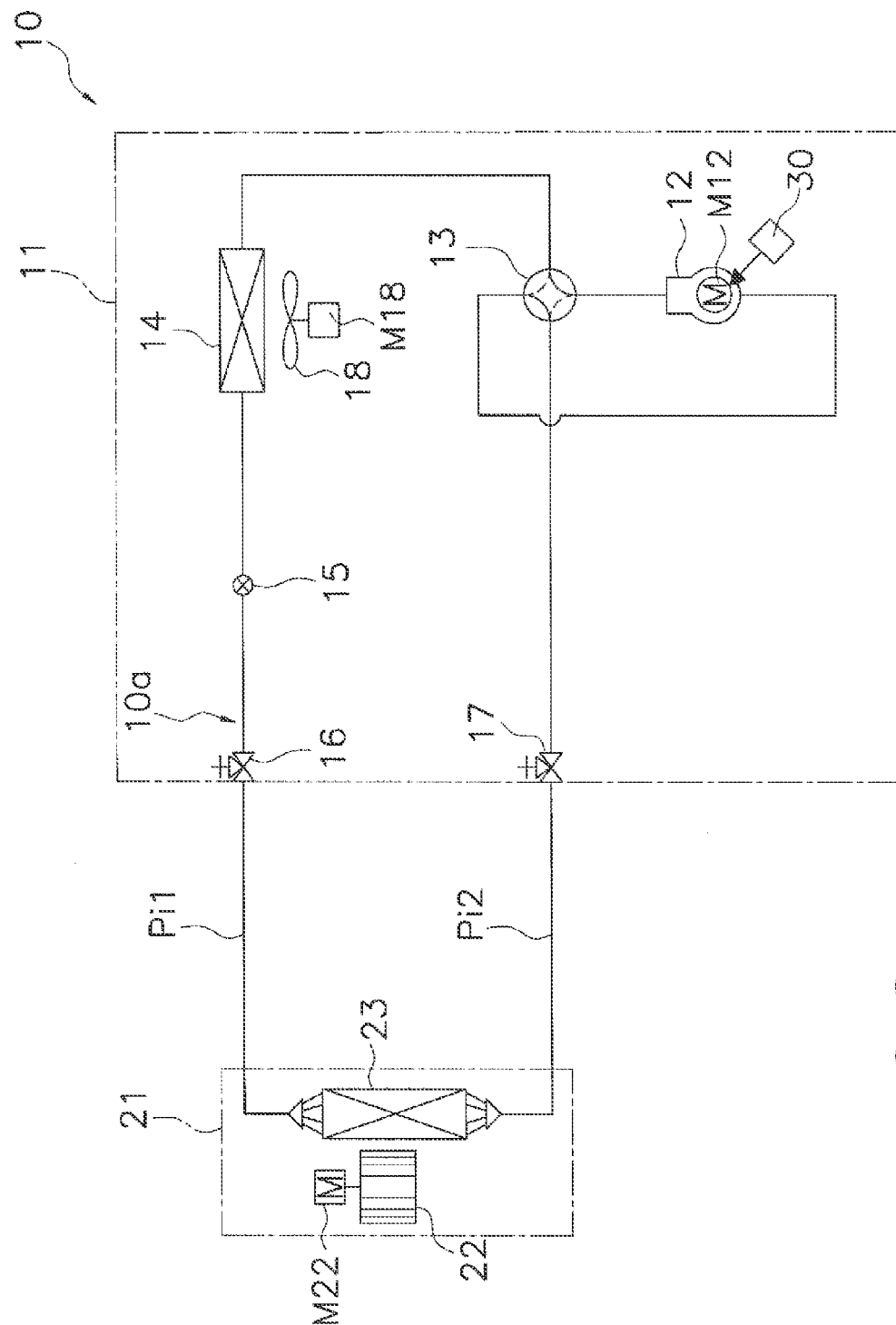
FIG. 2 is a diagram illustrating a simple configuration of an air conditioner where the motor driving apparatus is mounted.

FIG. 1 represents a configuration of the entirety of a motor driving system 100 which includes a compressor motor M12 and a motor driving apparatus 30 according to the present embodiment which is for controlling driving of the motor M12. The motor driving system 100 is mounted inside an air conditioner 10 which consists of the configuration which is shown in FIG. 2. In particular, as shown in FIG. 2, the motor driving apparatus 30 according to the present embodiment is also mounted inside an outdoor unit 11 since the compressor motor M12 is provided inside the outdoor unit 11 as will be described later.

Here, the configuration of the air conditioner 10 will be described. The air conditioner 10 is a separator type of air conditioner which mainly has the outdoor unit 11 which is installed outdoors and an indoor unit 21 which is installed indoors such as on the ceiling or a wall surface as shown in FIG. 2. The outdoor unit 11 and the indoor unit 21 are connected using refrigerant piping Pi1 and Pi2 and configure a vapor compression type of refrigerant circuit 10a. It is possible for the air conditioner 10 to perform an air cooling operation, an air heating operation, and the like.

(1-1) Outdoor Unit 11

The outdoor unit 11 mainly has a compressor 12, a four-way valve 13, an outdoor heat exchanger 14, an expansion valve 15, a liquid side shutoff valve 16, a gas side shutoff valve 17, and an outdoor fan 18.

The compressor 12 is a mechanism which suctions in and compresses low-pressure gas refrigerant and discharges high-pressure gas refrigerant after compression. Here, a tightly sealed compressor is adopted as the compressor 12 such that a positive displacement type compression element (which is not shown in the diagrams) such as a rotary type or a scrolling type, which is accommodated inside a casing (which is not shown in the diagrams), is driven with the compressor motor M12 which is accommodated in the same casing as the drive source, and due to this, it is possible to control the capacity of the compressor 12. That is, the compressor 12 is a compressor which is a type where the compressor varies its capacity.

The compressor motor M12 is a three-phase brushless DC motor. Although not shown in the diagrams, the compressor motor M12 has a stator, a rotor, Hall elements, and the like. The stator is configured by a plurality of drive coils. The rotor is configured by permanent magnets. The Hall elements are elements for detecting the position of the rotor with regard to the stator.

The four-way valve 13 is a valve for switching the direction of the flow of refrigerant when switching between an air cooling operation and an air heating operation. During an air cooling operation, the four-way valve 13 connects the discharge side of the compressor 12 and the gas side of the outdoor heat exchanger 14 and connects the gas side shutoff valve 17 and the suction side of the compressor 12 (refer to the solid line of the four-way valve 13 in FIG. 2). In addition, during an air heating operation, the four-way valve 13 connects the discharge side of the compressor 12 and the gas side shutoff valve 17 and connects the gas side of the outdoor heat exchanger 14 and the suction side of the compressor 12 (refer to the dash line of the four-way valve 13 in FIG. 2). That is, the connection state which is adopted by the four-way valve 13 changes according to the type of operation in the air conditioner 10.

The outdoor heat exchanger 14 is a heat exchanger which functions as a radiator for refrigerant during an air cooling operation and which functions as an evaporator for refrigerant during an air heating operation. The outdoor heat exchanger 14 is configured by, for example, a plurality of fins and a plurality of heat transfer pipes which are inserted in the fins and performs heat exchange between outdoor air which is supplied using the outdoor fan 18 and refrigerant which flows through the inside of the transfer pipes. The liquid side of the outdoor heat exchanger 14 is connected with the expansion valve 15 and the gas side of the outdoor heat exchanger 14 is connected with the four-way valve 13.

The expansion valve 15 is configured using an motor operated expansion valve. The expansion valve 15 reduces the pressure of high-pressure liquid refrigerant where heat is released in the outdoor heat exchanger 14 during an air cooling operation before the refrigerant is sent to the indoor heat exchanger 23 (which will be described later). In addition, the expansion valve 15 reduces the pressure of high-pressure liquid refrigerant where heat is released in the indoor heat exchanger 23 during an air heating operation before the refrigerant is sent to the outdoor heat exchanger 14.

The liquid side shutoff valve 16 and the gas side shutoff valve 17 are valves which are provided at the connection openings of external devices and the refrigerant pipings Pi1 and Pi2. In an inner section of the outdoor unit 11, the liquid side shutoff valve 16 is connected to the expansion valve 15. The gas side shutoff valve 17 is connected to the four-way valve 13.

The outdoor fan 18 supplies outdoor air to the outdoor heat exchanger 14 by suctioning outdoor air into the outdoor unit 11 and exhausts the air to the outside of the outdoor unit 11. For example, a propeller fan is adopted as the outdoor fan 18 and is rotationally driven with an outdoor fan motor M18 as the drive source. The outdoor fan motor M18 is a three-phase brushless motor which has a stator, a rotor, and the like in the same manner as the compressor motor M12.

Other than this, the outdoor unit 11 has various sensors such as a refrigerant pressure sensor, a refrigerant temperature detecting sensor, and an outside air temperature detecting sensor, an outdoor unit control section (which is not shown in the diagrams) which controls various types of devices inside the outdoor unit 11, and the like.

(1-2) Indoor Unit

The indoor unit 21 mainly has the indoor fan 22 and the indoor heat exchanger 23, and the indoor fan 22 and the indoor heat exchanger 23 are installed at an inner section of a casing for the indoor unit 21.

The indoor fan 22 is a centrifugal fan which takes in indoor air into the inside of the casing via an intake opening (which is not shown in the diagrams) and blows out the air from the inside of the casing to the indoors via a blowout opening (which is not shown in the diagrams) after heat exchange is carried out in the indoor heat exchanger 23. The indoor fan 22 is configure by, for example, a sirocco fan and is rotationally driven with an indoor fan motor M22 as the drive source. The indoor fan motor M22 is a three-phase brushless motor which has a stator, a rotor, and the like in the same manner as the outdoor fan motor M18.

The indoor heat exchanger 23 is a heat exchanger which functions as an evaporator for refrigerant during an air cooling operation and which functions as a radiator for refrigerant during an air heating operation. The indoor heat exchanger 23 is connected with each of the refrigerant pipings Pi1 and Pi2. The indoor heat exchanger 23 is configured by, for example, a plurality of fins and a plurality of heat transfer pipes which are inserted in the fins. The indoor heat exchanger 23 performs heat exchange between air from indoors which is suctioned into the inside of the casing and refrigerant which flows through the transfer pipes.

Other than this, the indoor unit 21 has a horizontal flap which is provided at a blowout opening, various types of sensors such as a suction air temperature detecting sensor, an indoor unit control section which controls various types of devices inside the indoor unit 21, and the like although these are not shown in the diagrams.

(2) Configuration of Motor Driving Apparatus

The motor driving apparatus 30 according to the present embodiment is mainly provided with a filter 31, a rectifying section 32, an input side detecting section 33 (which is equivalent to a power source variation information detecting section), a boosting section 34, an output side detecting section 35, a smoothing capacitor 36, a drive voltage output section 37, a boost driving section 40, and a controller 41. These configuration elements of the motor driving apparatus 30 are mounted on a print substrate P1.

Furthermore, two connectors IF1 and IF2 are mounted on the print substrate P1. The connector IF1 is an interface which links the print substrate P1 and a commercial power source 91 which is an output source for an alternating voltage with a plurality of phases (referred to below as a power source voltage V0) via a harness. The connector IF2 is an interface which links the compressor motor M12 and the print substrate P1 via a harness.

(2-1) Filter

The filter 31 is positioned between the commercial power source 91 and the rectifying section 32. The filter 31 is a low-pass filter which is configured using a coil 31a and a capacitor 31b and removes high-frequency noise components which are generated in the boosting section 34 and the drive voltage output section 37.

The coil 31a is connected in series with regard to the output of the commercial power source 91 and the capacitor 31b is connected in parallel with regard to the coil 31a at the output side of the coil 31a (that is, the rectifying section 32 side).

(2-2) Rectifying Section

The rectifying section 32 is connected to at a stage after the filter 31 and rectifies the power source voltage V0 after the power source voltage V0 passes through the filter 31.

The rectifying section 32 is a so-called diode bridge which is configured by four diodes 32a, 32b, 32c, and 32d. Out of the four diodes 32a to 32d, two groups of diodes are formed by two of the diodes being connected to each other in series and the groups of diodes are connected with each other in parallel. In detail, each of the cathode terminals of the diodes 32a and 32c are connected with each other using a power source wiring 51 and each of the anode terminals of the diodes 32b and 32d are connected with each other using a GND wiring 52.

Then, the connection points of the diodes which are in each of the groups of diodes are each connected with the output of the commercial power source 91. In detail, the anode terminal of the diode 32a and the cathode terminal of the diode 32b are connected to each other and are connected to the output of one of the commercial power source 91. The anode terminal of the diode 32c and the cathode terminal of the diode 32d are connected to each other and are connected to the output of another of the commercial power source 91.

Figure 3:
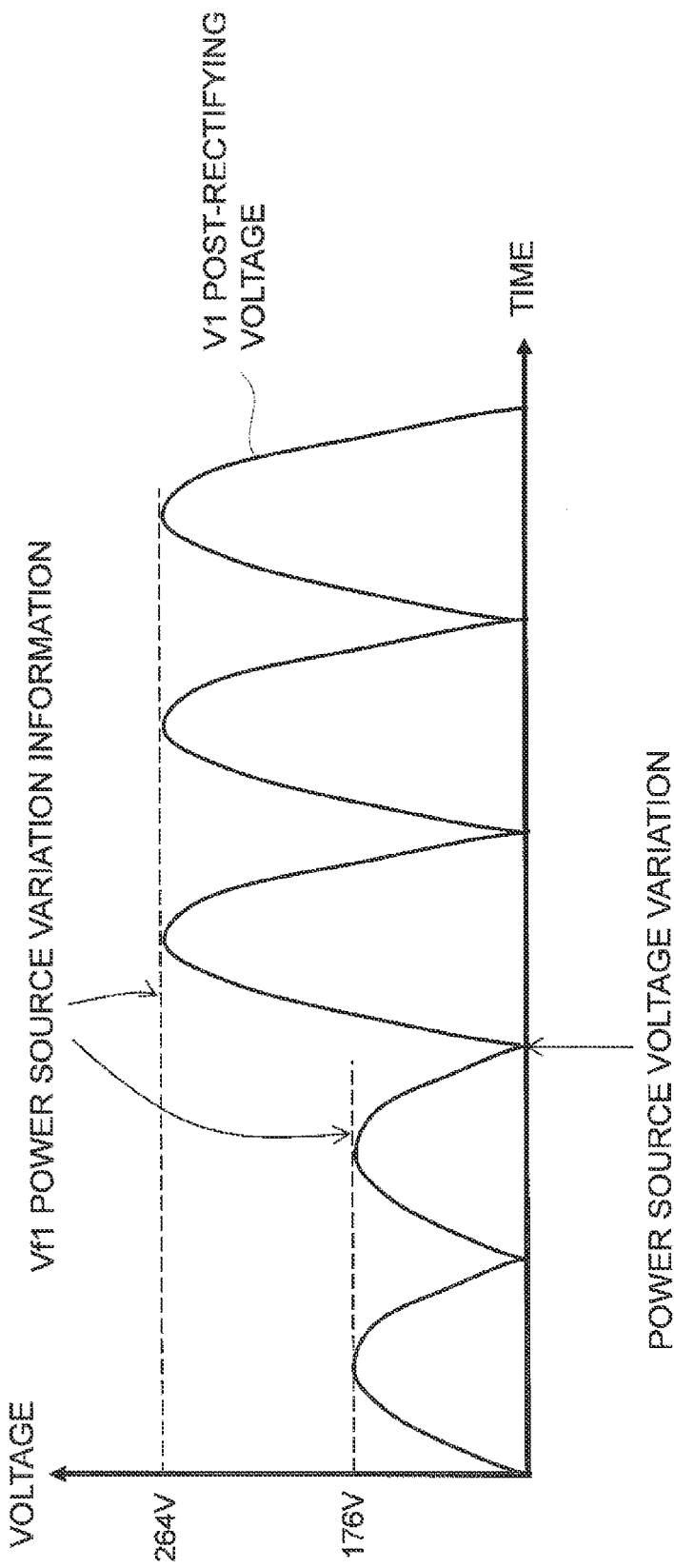
FIG. 3 is a diagram for explaining the relationship between a post-rectifying voltage and an input voltage value which is an output of the input side detecting section.

According to the rectifying section 32 which has this configuration, each phase of the alternating power source voltage V0 which is output from the commercial power source 91 and passes through the filter 31 is full-wave rectified as shown in FIG. 3. The power source voltage V0 after being rectified by the rectifying section 32 is referred to below as a "post-rectifying voltage V1" for convenience in the description.

(2-3) Input Side Detecting Section

The input side detecting section 33 is positioned at a stage after the rectifying section 32, in more detail, between the rectifying section 32 and the boosting section 34. The input side detecting section 33 detects the value of the post-rectifying voltage V1 including cases where there is variation in the power source voltage V0 and cases where there is no variation in the power source voltage V0.

Here, the post-rectifying voltage V1 is a voltage after the power source voltage V0 is rectified and is applied to the boosting section 34. For this reason, it is possible for the post-rectifying voltage V1 to be referred to as an input voltage which is related to the power source voltage V0 when the boosting section 34 is a reference.

The value of the input voltage in a case where there is variation in the power source voltage V0 is labeled below as "power source variation information Vf1" for convenience in the description.

Here, the power source variation information Vf1 will be described. There is variation in the power source voltage V0 due to various causes. An one example, there are cases where the load with regard to the installation capacity of the commercial power source 91 is temporarily excessive due to various devices being operated at the same time when the various devices use the power source voltage V0 which is output from the commercial power source 91 as a power source. In this case, the power source voltage V0 is lowered from the reference value. This causes a large current to flow from the commercial power source 91 to the side of the various devices and the commercial power source 91 to be unable to bear the effects of this. In contrast to this, the power source voltage V0 is also increased more than the reference value in a case where the load is smaller than the standard since hardly any of the devices are being operated. This causes the current which flows from the commercial power source 91 to the side of the devices to be small since there are only a few devices which are being operated. Other than this, there is variation in the power source voltage V0 due to various reasons.

There are times when the value of the power source voltage V0 is dispersed over a range from, for example, minus 10% to plus 10% with regard to the reference value for the power source voltage V0 in a case where there is variation in the power source voltage V0 in this manner.

Here, there are cases where there is temporary, that is, transient, variation in the power source voltage V0 described above. Furthermore, it is possible for there to be cases where there is always variation in the power source voltage V0 described above. That is, it can be said that there is variation in the power source voltage V0 even in a case where the value of the power source voltage V0 is always maintained in a state having deviated with regard to the standard voltage value which is the reference value.

When the power source voltage V0 varies, the voltage which is input into the rectifying section 32 varies and consequently the voltage which is input into the boosting section 34 also varies. Therefore, the input side detecting section 33 according to the present embodiment detects the power source variation information Vf1, that is, the value of the post-rectifying voltage V1 (that is, the input voltage) which is the power source voltage V0 after rectifying so as to ascertain the extent of the variation in the post-rectifying voltage V1, which is the power source voltage V0 after rectifying, from the reference value.

In particular, the input side detecting section 33 according to the present embodiment outputs the peak value of the power source voltage V0 (that is, the post-rectifying voltage V1) which is full-wave rectified as the power source variation information Vf1 which is the detection results as shown in FIG. 3. Here, the input side detecting section 33 may have specifications so as to detect the actual value, the average value, the variation value, or the like of the power source voltage V0 instead of the power source voltage V0 as shown in FIG. 3. In the present embodiment, description is performed with regard to the case where the input side detecting section 33 has specifications so as to detect the peak value of the power source voltage V0.

The input side detecting section 33 which detects the peak value of the power source voltage V0 is configured using a capacitor, a peak hold circuit, an AD converter, a DC-DC converter, and the like which are not shown in the diagrams as well as two resistors 33a and 33b which are connected to each other in series as shown in FIG. 1. The two resistors 33a and 33b which are connected to each other in series are connected in parallel with regard to the rectifying section 32. That is, one end of the resistor 33a is connected with the power source wiring 51 and one end of the resistor 33b is connected with the GND wiring 52. Each of the other ends of the resistors 33a and 33b are connected to each other. The voltage value at the connection point of the resistors 33a and 33b is input into the peak hold circuit which is not shown in the diagrams and the peak value which is the highest value for the post-rectifying voltage V1 is held for a specific period of time in the peak hold circuit. The highest value for the post-rectifying voltage V1 is input into the controller 41 as the detection results from the input side detecting section 33 after AD converting using the AD converter.

Accordingly, the peak value of the post-rectifying voltage V1, for example, is 176 V up until there is variation in the power source voltage V0 and the peak value of the post-rectifying voltage V1, for example, is 264 V after there is variation in the power source voltage V0. In this case, the input side detecting section 33 carries out peak holding of 176 V up until there is variation in the power source voltage V0 and outputs this as the detection results. The input side detecting section 33 carries out peak holding of 264 V up until the peak value of the post-rectifying voltage V1 changes next after there is variation in the power source voltage V0 and outputs this as the detection results.

Here, as the timing when the input side detecting section 33 according to the present embodiment performs an operation of detecting the power source variation information Vf1, there is the example of while the compressor motor M12 is actually being driven. Alternatively, as the timing when the input side detecting section 33 according to the present embodiment performs an operation of detecting the power source variation information Vf1, there is the example of before driving of the compressor motor M12 starts, that is, before activation of the compressor motor M12.

(2-4) Boosting Section

The boosting section 34 is positioned at a stage after the input side detecting section 33, in more detail, between the input side detecting section 33 and the output side detecting section 35. The post-rectifying voltage V1 is applied to the boosting section 34 as the input voltage. The boosting section 34 generates a post-boosting voltage V2 by boosting the post-rectifying voltage V1.

The boosting section 34 is a boosting type of power factor improvement circuit and is configured using a so-called boosting chopper circuit. In detail, the boosting section 34 is configured using three coils L34a, L34b, and L34c, three insulation gate bipolar transistors Q34a, Q34b, and Q34c (simply referred to below as transistors), three resistors R34a, R34b, and R34c, and three diodes D34a, D34b, and D34c as shown in FIG. 1.

The coil L34a is connected in series on the power source wiring 51. With the post-rectifying voltage V1 which is the input voltage to the boosting section 34 as electrical energy, the coil L34a carries out the role of changing this to magnetic flux energy and accumulating the magnetic flux energy. Here, the inductance value of the coil L34a is appropriately determined according to the current value which flow on the power source wiring 51, the switching frequency of the transistor Q34a, and the like.

The transistor Q34a is an Nch transistor and carries out the role of a switch which controls charging and discharging in the coil L34a. The collector terminal of the transistor Q34a is connected to the current output side of the coil L34a and the emitter terminal of the transistor Q34a is connected to one end of the resistor R34a. The base terminal of the transistor Q34a is connected to the output of the boost driving section 40, and on and off of the transistor Q34a is controlled using the boost driving section 40. In detail, the transistor Q34a is in an on state in a case where the voltage which is applied to the base terminal is higher than a predetermined value and current flows from the collector of the transistor Q34a to the emitter of the transistor Q34a. In contrast to this, the transistor Q34a is in an off state in a case where the voltage which is applied to the base terminal is lower than a predetermined value and current does not flow in the transistor Q34a.

The other terminal of the resistor R34a is connected to the GND wiring 52. The resistor R34a is a shunt resistor for detecting current which flows in the transistor Q34a. The resistor R34a performs current detecting in order for stable energy to be supplied to a stage after the boosting section 34 even if the value of the post-boosting voltage V2 rises and falls to a certain extent. Consequently, the value of the resistor R34a is determined to be a value which is appropriate so as not to impede an operation of boosting the voltage using the boosting section 34.

The diode D34a is connected on the power source wiring 51 in series on the current output side of the coil L34a. The anode terminal of the diode D34a is connected more to the downstream side than the connection point of the coil L34a and the transistor Q34a in a direction in which the current flows on the current output side of the coil L34a. The cathode terminal of the diode D34a is connected to the drive voltage output section 37 side. The diode D34a permits flow of current from the coil L34a side to the drive voltage output section 37 side in a case where the size of the voltage value which is applied between the terminals of the diode D34a is larger than a predetermined voltage (for example, 0.7 V). In contrast to this, the diode D34a restricts flow of current from the coil L34a side to the drive voltage output section 37 side in a case where the size of the voltage value which is applied between the terminals of the diode D34a is smaller than the predetermined voltage.

The operations of the coil L34a, the transistor Q34a, the resistor R34a, and the diode D34a with these configurations will be described. Firstly, when the transistor Q34a is on, a current path is formed from the power source wiring 51 to the GND wiring 52 via the coil L34a, the transistor Q34a, and the resistor R34a and current flows in this order. With this, magnetic energy is accumulated in the coil L34a due to current flowing through the coil L34a. Next, when the transistor Q34a is turned off after this state, the current path described above is interrupted by the transistor Q34a. For this reason, current which flows through the coil L34a up until this point is output from the boosting section 34 via the diode D34a and flows into the smoothing capacitor 36 which is positioned at a stage after the boosting section 34. In this manner, the operation of current flowing into the smoothing capacitor 36 via the diode D34a is performed until there is no more magnetic energy in the coil L34a. With this, the smoothing capacitor 36 is charged and the voltage at both ends of the smoothing capacitor 36 is higher.

Next, the configurations of the connections between the coil L34b, the transistor Q34b, the resistor R34b, and the diode D34b will be described. The coil L34b and the diode D34b are connected to each other in series in the same manner as the coil L34a and the diode D34a, and are connected in parallel with regard to the coil L34a and the diode D34a which are connected to each other. The connection point of the coil L34b and the diode D34b is connected to the GND wiring 52 via the transistor Q34b and the resistor R34b. The transistor Q34b is an Nch transistor and the base terminal of the transistor Q34b is connected to the boost driving section 40. On and off of the transistor Q34b is controlled using the boost driving section 40.

The operations of the coil L34b, the transistor Q34b, the resistor R34b, and the diode D34b with these configurations are the same as the coil L34a, the transistor Q34a, the resistor R34a, and the diode D34a described above. That is, with the post-rectifying voltage V1 which is the input voltage to the boosting section 34 as electrical energy, the coil L34b carries out the role of changing this to magnetic flux energy and accumulating the magnetic flux energy. The transistor Q34b carries out the role of a switch which controls charging and discharging of the coil L34b. The resistor R34b is a shunt resistor for detecting current which flows in the transistor Q34b. The diode D34b permits the flow of current or interrupts the flow of current from the coil L34b side to the drive voltage output side 37 side depending on the size of the voltage value which is applied between the terminals of the diode D34b.

When the transistor Q34b is on, a current path is formed from the power source wiring 51 to the GND wiring 52 via the coil L34b, the transistor Q34b, and the resistor R34b and current flows in this order. Magnetic energy is accumulated in the coil L34b due to current flowing through the coil L34b. Next, when the transistor Q34b is turned off after this state, the current path described above is interrupted by the transistor Q34b. For this reason, current which flows through the coil L34b up until this point is output from the boosting section 34 via the diode D34b and flows into the smoothing capacitor 36 which is positioned at a stage after the boosting section 34. In this manner, the operation of current flowing into the smoothing capacitor 36 via the diode D34b is performed until there is no more magnetic energy in the coil L34a. With this, the smoothing capacitor 36 is charged and the voltage at both ends of the smoothing capacitor 36 is higher.

Here, the configuration of the connections between and the operations of the coil L34c, the transistor Q34c, the resistor R34c, and the diode D34c are the same as the configuration of the connections between and the operations of the coil L34b, the transistor Q34b, the resistor R34b, and the diode D34b described above. Consequently, detailed description of the configuration of the connections between and the operations of the coil L34c, the transistor Q34c, the resistor R34c, and the diode D34c will be omitted.

(2-5) Output Side Detecting Section

The output side detecting section 35 is connected at the side of a stage after the boosting section 34, in more detail, between the boosting section 34 and the smoothing capacitor 36. The output side detecting section 35 detects a value Va1 of the post-boosting voltage V2. The value Va1 of the post-boosting voltage V2 which is detected using the output side detecting section 35 is output to the controller 41.

The output side detecting section 35 is configured using an AD converter and the like as well as two resistors 35a and 35b which are connected to each other in series as shown in FIG. 1. The two resistors 35a and 35b which are connected to each other in series are connected in parallel with the boosting section 34. One end of the resistor 35a is connected with the power source wiring 51 and one end of the resistor 35b is connected with the GND wiring 52. The other ends of the resistors 35a and 35b are connected to each other. The voltage value at the connection point of the resistors 35a and 35b is input into the controller 41 after AD converting using the AD converter. It is possible for the controller 41 to ascertain the value Va1 of the post-boosting voltage V2 from the value after AD conversion.

Here, as the timing when the output side detecting section 35 performs an operation of detecting the value Va1 of the post-boosting voltage V2, there are the examples of while the compressor motor M12 is actually being driven or before activation of the compressor motor M12 in the same manner as the period of time for detecting by the input side detecting section 33.

(2-6) Smoothing Capacitor

The smoothing capacitor 36 is configured, for example, using an electrolytic capacitor and is connected in parallel with regard to the boosting section 34. In detail, the smoothing capacitor 36 is positioned between the output side of the boosting section 34 and the input side of the drive voltage output section 37. The smoothing capacitor 36 generates a direct current voltage with relatively small ripples by smoothing the post-boosting voltage V2 after boosting using the boosting section 34.

The direct current voltage which is generated is output to the drive voltage output section 37 which is at a later stage of the smoothing capacitor 36.

(2-7) Drive Voltage Output Section

Figure 4:
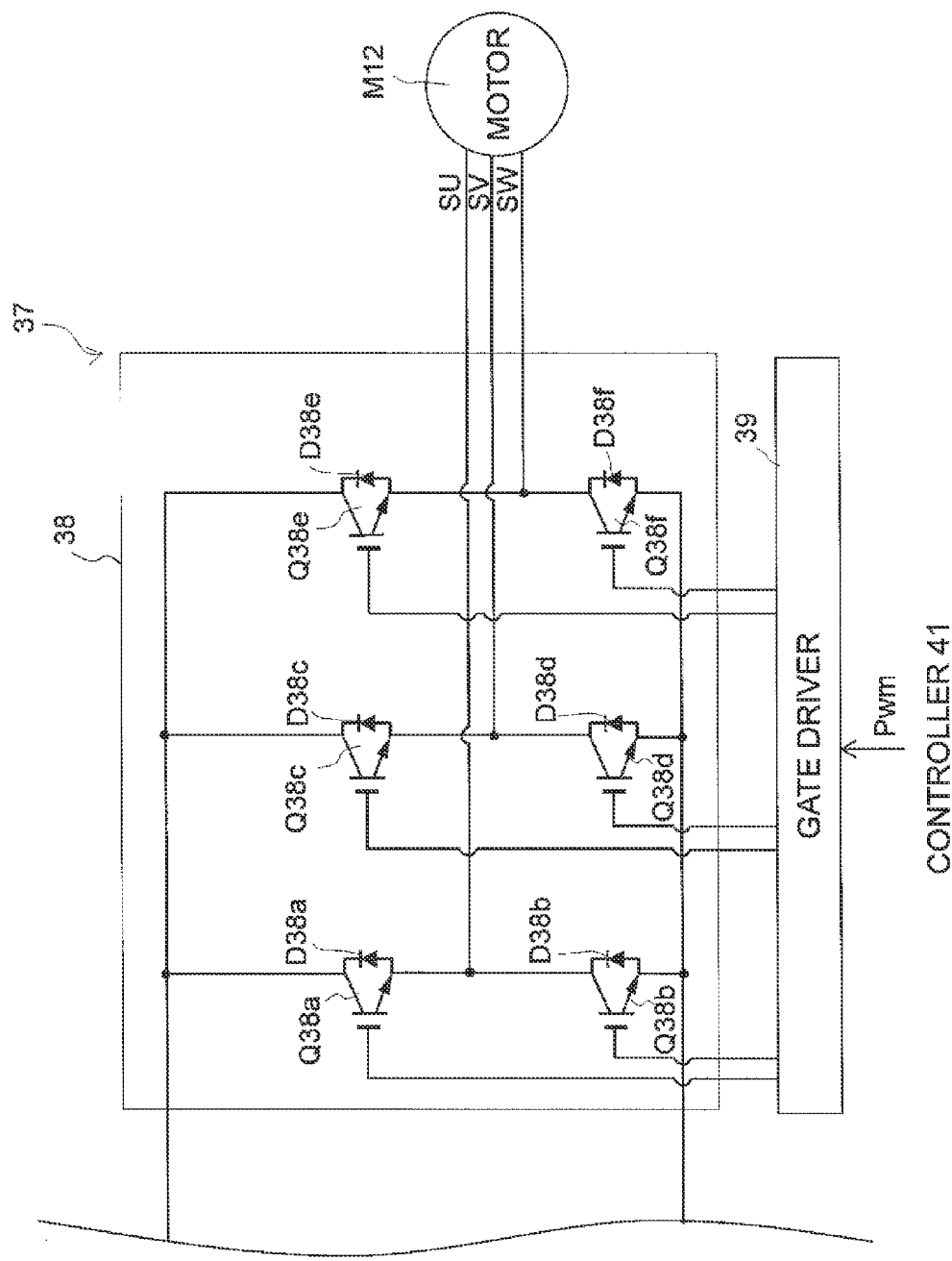
FIG. 4 is an enlarged diagram of a driving voltage output section.

The drive voltage output section 37 is connected at a stage after the smoothing capacitor 36. The drive voltage output section 37 generates drive voltages SU, SV, and SW with three phases for driving the compressor motor M12 using the direct current voltage which is generated using the smoothing capacitor 36, that is, the post-boosting voltage V2 which is smoothed and outputs the drive voltages SU, SV, and SW to the motor M12. The drive voltage output section 37 has an inverter 38 and a gate driver 39 as shown in FIG. 4.

The inverter 38 is connected in parallel with regard to the smoothing capacitor 36. The inverter 38 converts the direct current voltage to the drive voltages SU, SV, and SW which are alternating current voltages. The inverter 38 is configured by a plurality of insulated gate bipolar transistors Q38a, Q38b, Q38c, Q38d, Q38e, and Q38f (which are equivalent to switching elements and are simply referred to below as transistors) and a plurality of circulation diodes D38a, D38b, D38c, D38d, D38e, and D38f as shown in FIG. 4. The transistors Q38a and Q38b, Q38c and Q38d, and Q38e and Q38f are each connected with each other in series, and each of the diodes D38a to D38f are connected with the respective transistors Q38a to Q38f in parallel.

The inverter 38 generates the drive voltages SU, SV, and SW by performing on and off of each of the transistors Q38a to Q38f at predetermined timings. It is possible for the compressor motor M12 to be rotated using the drive voltages SU to SW.

The gate driver 39 is mainly connected with the controller 41 and the gate terminals of each of the transistors Q38a to Q38f in the inverter 38. The gate driver 39 turns each of the transistors Q38a to Q38f on and off by performing control of applying of a gate voltage to each of the transistors Q38a to Q38f in the inverter 38 based on a motor drive signal Pwm which is output from the controller 41.

The gate driver 39 is configured using, for example, an integrated circuit which is configured using a plurality of MOS transistors or the like.

(2-8) Boost Driving Section

The boost driving section 40 is connected to the controller 41 and the gate terminals of each of the transistors Q34a to Q34c in the boosting section 34. The boost driving section 40 turns each of the transistors Q34a to Q34c on and off by performing control of applying of a gate voltage to each of the transistors Q34a to Q34c based on a boost drive signal Con which is output from the controller 41.

The boost driving section 40 is configured using, for example, an integrated circuit which is configured using a plurality of MOS transistors or the like in the same manner as the gate driver 39.

(2-9) Controller

The controller 41 is a computer which is configured using a memory 42 and a CPU 43. The controller 41 is connected to the output side of the input side detecting section 33, the input side of the boost driving section 40, the output side of the output side detecting section 35, both ends of the resistor R34c inside the boosting section 34, and the input side of the gate driver 39 in the drive voltage output section 37 as shown in FIG. 1 and FIG. 4.

The controller 41 determines the motor drive signal Pwm based on information on the position of the rotor in the compressor motor M12 and outputs the motor drive signal Pwm to the drive voltage output section 37. The information on the position of the rotor in the compressor motor MI 2 is output from a Hall element in the compressor motor M12, a current transformer which is not shown in the diagrams, a current detecting section on the GND wiring 52 which is not shown in the diagrams, or the like. Furthermore, the controller 41 ascertains the value of the motor current which passes through the compressor motor M12 from the detection results using the current detecting section on the GND wiring 52 which is not shown in the diagrams while the compressor motor M12 is being driven. Then, the controller 41 performs feedback control with regard to driving of the compressor motor M12 also using the motor current which is ascertained and either or both of the detection results from the detecting sections 33 and 35 at each point in time.

In addition, the controller 41 is connected to at least either or both ends of the resistor which is for one phase among the resistors R34a to R34c with three phases inside the boosting section 34. It is sufficient if it is possible for the controller 41 to ascertain current which flows through the transistors Q34a to Q34c using the voltages at both ends. The controller 41 is connected to both ends of the resistor R34c inside the boosting section 34 in FIG. 1 but may be connected to both ends of the resistor R34a or both ends of the resistor R34b instead of the resistor R34c.

Furthermore, the controller 41 according to the present embodiment performs control of the operation of boosting using the boosting section 34. The memory 42 (which is equivalent to a storage section) and the CPU 43 (which is equivalent to a determining section) of the controller 41 will mainly be described below focusing on the operation of boosting using the boosting section 34.

(2-9-1) Memory

The memory 42 is configured using, for example, a nonvolatile memory such as an EEPROM. Various types of programs which are for the CPU 43 to execute are stored in the memory 42.

In addition, the memory 42 also stores various types of real time information which is obtained from various types of devices which are connected to the CPU 43. As the various types of real time information, there are the examples of the power source variation information Vf1 (that is, the value of the post-rectifying voltage V1 which is the input voltage) which is the detection results from the input side detecting section 33, the value Va1 of the post-boosting voltage V2 which is the detection results from the output side detecting section 35, a boost internal current value which is obtained using the CPU 43 based on voltages Vr1-Vr2 at both ends of the resistor R34c, and the like.

Figure 5:
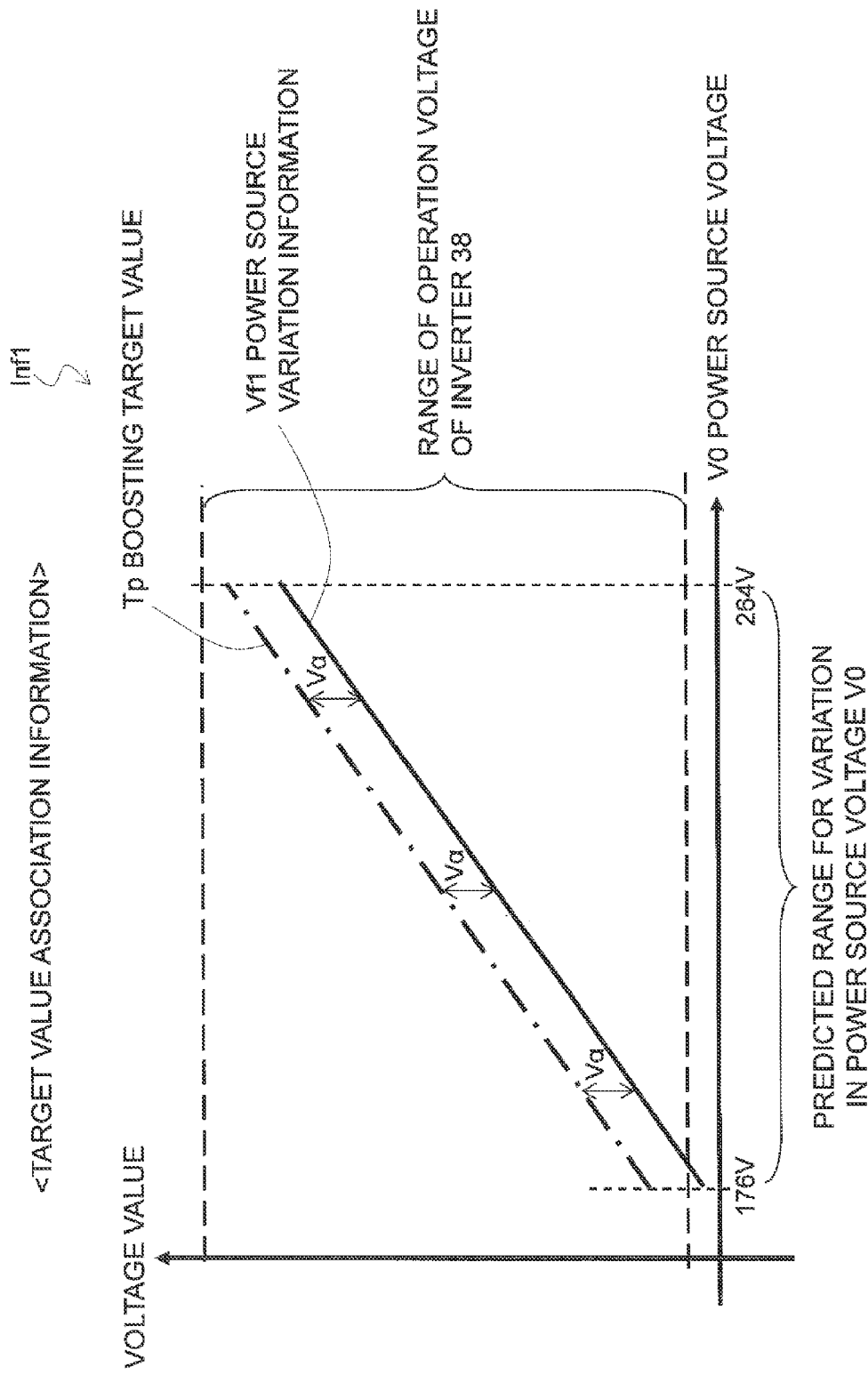
FIG. 5 is a diagram for explaining the concept of target value association information.

In particular, the memory 42 according to the present embodiment stores target value association information Inf1 (refer to FIG. 5). The target value association information Inf1 is information which associates the power source variation information Vf1 and a boosting target value Tp for the boosting section 34. The boosting target value Tp refers to a target value for the post-boosting voltage V2 which is to be generated by the boosting section 34.

Furthermore, in the target value association information Inf1 according to the present embodiment, the boosting target value Tp is not always held at a certain value even if, for example, the power source variation information Vf1 (in detail, the value of the post-rectifying voltage V1 which is the input voltage in a case where there is variation in the power source voltage V0) changes and the boosting target value Tp changes according to the power source variation information Vf1. FIG. 5 is a diagram which represents how the boosting target value Tp according to the present embodiment changes along with changes in the power source variation information Vf1 (that is, the value of the post-rectifying voltage V1 which is the input voltage) with the power source voltage V0 adopted as the horizontal axis and the voltage value adopted as the vertical axis. In detail, in FIG. 5, the boosting target value Tp adopts a smaller value as the value of the post-rectifying voltage V1 becomes smaller due to the value of the power source voltage V0 being smaller, and in contrast, the boosting target value Tp adopts a larger value as the value of the post-rectifying voltage V1 becomes larger due to the value of the power source voltage V0 being larger. Further adding to this, the boosting target value Tp has a relationship with the power source variation information Vf1 in the target value association information Inf1 where the boosting target value Tp changes in a linear manner in accompaniment with changes in the power source variation information Vf1 such that the boosting target value Tp increases in accompaniment with increases in the value of the power source voltage V0 and the boosting target value Tp is just a predetermined value higher than the power source voltage V0. The target value association information Inf1 is represented by the following equation (1).

$$Tp = Vf1 + V\alpha \quad (1)$$

"$V\alpha$" in the above equation (1) is a constant and is equivalent to the predetermined value described above. The above equation (1) represents that the boosting target value Tp is found by adding the constant $V\alpha$ to the power source variation information Vf1 (in detail, the value of the post-rectifying voltage V1 which is the input voltage) at each point in time. In other words, the above equation (1) indicates that the amount of boosting "$V\alpha$" for the boosting section 34 is always constant regardless of changes in the value of the post-rectifying voltage V1 which is the input voltage of the boosting section 34. Due to this, loss of power in the coils L34a to L34c which configure the boosting section 34 and the transistors Q34a to Q34c which are the power module is substantially constant since current which flows inside the boosting section 34 is constant regardless of the value of the post-rectifying voltage V1.

In particular, the target value association information Inf1 which is expressed using the above equation (1) is determined based on the range of operations of the drive voltage output section 37, in detail, the range of operations of the inverter 38 in the drive voltage output section 37. In more detail, the value of the boosting target value Tp is determined as a value within a range over which it is possible for the inverter 38 to operate without any problems using the post-boosting voltage V2 whatever the value of the post-rectifying voltage V1 in the power source variation information Vf1 within a range over which variation in the power source voltage V0 is predicted as shown in FIG. 5. This is due to the following reason.

The boosting target value Tp changes along with changes in the power source variation information Vf1 as represented by the above equation (1). The post-boosting voltage V2 which is the same value as the boosting target value Tp is supplied to the inverter 38 of the drive voltage output section 37 since the boosting target value Tp reflects the post-boosting voltage V2. However, it is not possible for the inverter 38 to be normally operated when the post-boosting voltage V2 reaches a low value or a high value due to changes in the boosting target value Tp and the post-boosting voltage V2 reaches a value which it is not possible to be permitted by the inverter 38 and there is a concern about consequently causing abnormalities in the driving of the compressor motor M12. Therefore, as shown in FIG. 5, the boosting target value Tp which changes according to the power source variation information Vf1 is determined to normally be within the range of operations of the inverter 38 in the target value association information Inf1 which represented in the above equation (1).

Furthermore, the target value association information Inf1 which is expressed by the above equation (1) according to the present embodiment is determined based on not only the range of operations of the drive voltage output section 37 but also on a condition where the boosting target value Tp is equal to or less than the standard voltages of the electrical components which configure the motor driving apparatus 30. As the electrical components which are referred to here, there are the examples of the electrical components which configure the functional section which is positioned on the latter stage side of the boosting section 34. In detail, as the electrical components, there are the examples of the smoothing capacitor 36 and the transistors Q38$a$ to Q38$f$ which configure the inverter 28 of the drive voltage output section 37.

That is, in the motor driving apparatus 30 according to the present embodiment, the boosting target value Tp is determined according to the power source variation information Vf1 as shown in the above equation (1). With this, there is a concern that the post-boosting voltage V2 which is output from the boosting section 34 will increase due to the power source variation information Vf1 and the durability (that is, the standard voltage value) on the latter stage side of the boosting section 34 (in detail, the smoothing capacitor 36 and the drive voltage output section 37) which is the destination for applying the post-boosting voltage V2 will be surpassed. However, here, the target value association information Inf1 is determined so that the boosting target value Tp is equal to or less than the respective standard voltages for the smoothing capacitor 36 and the transistors Q38$a$ to Q38$f$. Accordingly, it is possible to suppress the value of the post-boosting voltage V2 to be equal to or less than the respective standard voltages for the smoothing capacitor 36 and the transistors Q38$a$ to Q38$f$ even if the value of the post-boosting voltage V2 changes by changing the boosting target value Tp according to variation in the power source voltage V0.

The constant V$\alpha$ is the important key in the above equation (1) for determining the boosting target value Tp so that the boosting target value Tp is always within the range of operations of the inverter 38 and the target boosting value Tp is always equal to or less than the respective standard voltages for the smoothing capacitor 36 and the transistors Q38$a$ to Q38$f$. This is because there is a concern that, depending on the value which is adopted as the constant V$\alpha$, the boosting target value Tp which is obtained by adding the constant V$\alpha$ to the power source variation information Vf1 will surpass the range of operations of the inverter 38 and will surpass the respective standard voltages for the smoothing capacitor 36 and the transistors Q38$a$ to Q38$f$. Therefore, it is preferable that the constant V$\alpha$ be appropriately determined using desktop calculations, simulations, experimentation, and the like according to at least in the range of operations of the inverter 38, the range over which variation in the power source voltage V0 is predicted, and the range of equal to or less than the respective standard voltages for the smoothing capacitor 36 and the transistors Q38$a$ to Q38$f$.

Here, "the range over which variation in the power source voltage V0 is predicted" described above refers to, for example, a case where the power source voltage V0 varies within a range of −20% to +20% with regard to the reference value for the power source voltage V0.

Here, in relation to determining the constant V$\alpha$, the constant V$\alpha$ may be determined also in consideration of the specifications of the boost driving section 40, the specifications of the gate driver 39, and the like.

(2-9-2) CPU

The CPU 43 performs control of the operations of the boosting section 34. While the compressor motor M12 is being driven, in more detail, from before operation of the boosting section 34 until the completion of operation of the boosting section 34, the CPU 43 calculates the value of the boosting internal current which is current which flows in an inner section of the boosting section 34 based on the resistance value of the resistor R34$c$ in the boosting section 34 and the values of the voltages Vr1-Vr2 at both ends of the resistor R34$c$ at each passing of a predetermined period of time. The CPU 43 writes the boosting internal currents which are calculated at each passing of a predetermined period of time to the memory 42 one after the other. Then, the CPU 43 adjusts the width over which each of the transistors Q34$a$ to Q34$c$ in the boosting section 34 are turned on and off so that the post-boosting voltage V2 which is output by the boosting section 34 matches with the boosting target value Tp using the boosting internal current which is calculated at each point in time and the detection results from the output side detecting section 35 (that is, the value of the post-boosting voltage V2) at each point in time. That is, the CPU 43 performs feedback control with regard to the operation of boosting using the boosting section 34 by performing PWM control with regard to each of the transistors Q34$a$ to Q34$c$ using the real time boosting internal current and the value of the post-boosting voltage V2.

In particular, the CPU 43 according to the present embodiment determines the boosting target value Tp based on the detection results from the input side detecting section 33 (that is, the power source variation information Vf1) and the target value association information Inf1 which is stored in the memory 42. In detail, the CPU 43 determines the boosting target value Tp according to the power source voltage V0 at each point in time by applying the power source variation information Vf1 (that is, the value of the post-rectifying voltage V1 which is the input voltage), which is detected at each point in time, to equation (1) which represents the target value association information Inf1. Consequently, the CPU 43 changes the boosting target value Tp according to the value of the post-rectifying voltage V1 which relates to the power source voltage V0 which varies (that is, the power source variation information Vf1) in a case where there is variation in the power source voltage V0.

Figure 6:
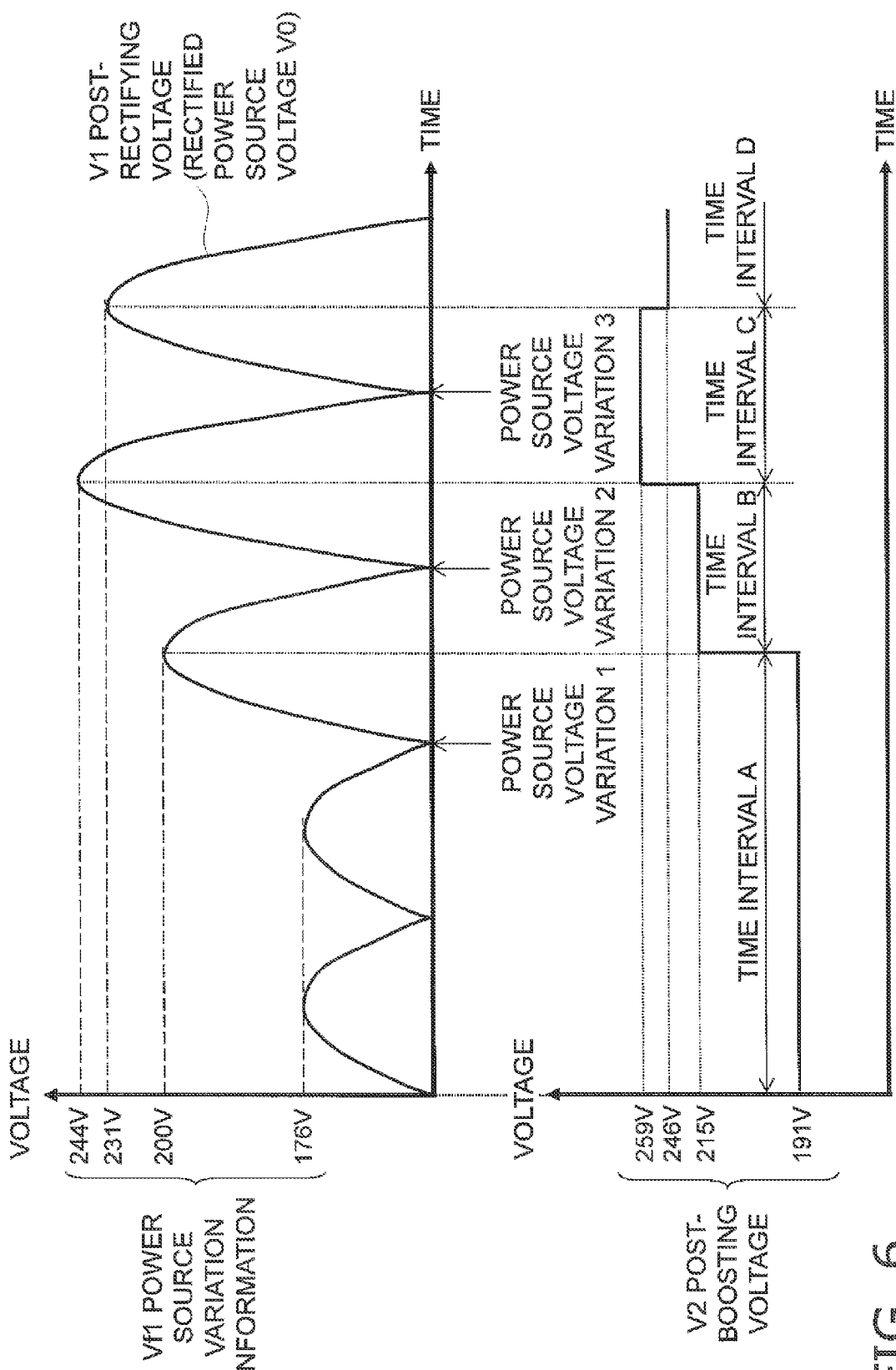
FIG. 6 is a diagram representing changes over time in a post-boosting voltage in a case where there is variation in a power source voltage.

Here, a detailed example of the boosting target value Tp which is determined by the CPU 43 and the post-boosting voltage V2 which is output from the boosting section 34 when there is variation in the power source voltage V0 will be described mainly using FIG. 6. It is assumed below that the constant Vα in equation (1) is "15 V".

Firstly, the peak value of the post-rectifying voltage V1 which is the power source voltage V0 which is rectified is set as "176 V". In this case, the detection results from the input side detecting section 33 is "176 V" and the CPU 43 determines that the boosting target value Tp is "191 V" (176+15=191) based on the detection results and equation (1). The CPU 43 generates the boost drive signal Con which corresponds to the boosting target value Tp of "191 V" and outputs the boost drive signal Con to the boost driving section 40. Due to this, the gate voltage, which is for turning each of the transistors Q34a to Q34c on and off so that the post-boosting voltage V2 is "191 V", is output from the boost driving section 40 to each of the transistors Q34a to Q34c. The pulse width of each of the transistors Q34a to Q34c is controlled and it is possible for the boosting section 34 to output the post-boosting voltage V2 which is approximately "191 V". Calculation of the boosting internal current according to the voltages Vr2-Vr1 at both ends of the resistor R34c and an operation of detecting by the output side detecting section 35 are performed at each passing of a predetermined period of time (for example, 10 msec) and feedback control is performed with regard to the boosting section 34 for the value of the post-boosting voltage V2 to be maintained during a time interval A where the post-boosting voltage V2 which is approximately "191 V" is continually output. In addition, the input side detecting section 33 also performs an operation of detecting at each passing of a predetermined period of time and these detection results are utilized by the CPU 43 for monitoring of whether or not there is variation in the power source voltage V0.

Next, the power source voltage V0 varies (power source voltage variation 1) and the peak value of the post-rectifying voltage V1 is increased to "200 V" as a result. In this case, the result of detecting by the input side detecting section 33 is "200 V" and the CPU 43 increases the boosting target value Tp from "191 V" to "215 V" (200+15=215 V) based on the detection results and equation (1). The CPU 43 generates the boost drive signal Con which corresponds to the boosting target value Tp of "215 V" and outputs the boost drive signal Con to the boost driving section 40. Due to this, the gate voltage, which is so that the post-boosting voltage V2 becomes "215 V", is output from the boost driving section 40 to each of the transistors Q34a to Q34c and the post-boosting voltage V2 which is output by the boosting section 34 changes from approximately "191 V" to approximately "215 V". Calculation of the boosting internal current according to the voltages Vr2-Vr1 at both ends of the resistor R34c and an operation of detecting by the output side detecting section 35 are performed at each passing of a predetermined period of time (for example, 10 msec) and feedback control is performed with regard to the boosting section 34 for the value of the post-boosting voltage V2 to be maintained during a time interval B where the post-boosting voltage V2 which is approximately "215 V" is continually output. In addition, the input side detecting section 33 also performs an operation of detecting at each passing of a predetermined period of time and these detection results are utilized by the CPU 43 for monitoring of whether or not there is variation in the power source voltage V0. Due to this, it is possible for the boosting section 34 to stably continue an operation of boosting.

Next, the power source voltage V0 further varies (power source voltage variation 2) and the peak value of the post-rectifying voltage V1 is increased to "244 V" as a result. In this case, the result of detecting by the input side detecting section 33 is "244 V" and the CPU 43 further increases the boosting target value Tp from "215 V" to "259 V" (244+15=259 V) based on the detection results and equation (1). The CPU 43 generates the boost drive signal Con which corresponds to the boosting target value Tp of "259 V" and outputs the boost drive signal Con to the boost driving section 40. Due to this, the gate voltage, which is so that the post-boosting voltage V2 becomes "259 V", is output from the boost driving section 40 to each of the transistors Q34a to Q34c and the post-boosting voltage V2 which is output by the boosting section 34 changes from approximately "215 V" to approximately "259 V". Calculation of the boosting internal current according to the voltages Vr2-Vr1 at both ends of the resistor R34c and an operation of detecting by the output side detecting section 35 are performed at each passing of a predetermined period of time (for example, 10 msec) and feedback control is performed with regard to the boosting section 34 for the value of the post-boosting voltage V2 to be maintained during a time interval C where the post-boosting voltage V2 which is approximately "259 V" is continually output. In addition, the input side detecting section 33 also performs an operation of detecting at each passing of a predetermined period of time and these detection results are utilized by the CPU 43 for monitoring of whether or not there is variation in the power source voltage V0.

Next, the power source voltage V0 further varies (power source voltage variation 3) and the peak value of the post-rectifying voltage V1 is reduced to "231 V" as a result. In this case, the result of detecting by the input side detecting section 33 is "231 V" and the CPU 43 lowers the boosting target value Tp from "259 V" to "246 V" (231+15=246 V) based on the detection results and equation (1). The CPU 43 generates the boost drive signal Con which corresponds to the boosting target value Tp of "246 V" and outputs the boost drive signal Con to the boost driving section 40. Due to this, the gate voltage, which is so that the post-boosting voltage V2 becomes "246 V", is output from the boost driving section 40 to each of the transistors Q34a to Q34c and the post-boosting voltage V2 which is output by the boosting section 34 changes from approximately "259 V" to approximately "246 V". Calculation of the boosting internal current according to the voltages Vr2-Vr1 at both ends of the resistor R34c and an operation of detecting by the output side detecting section 35 are performed at each passing of a predetermined period of time (for example, 10 msec) and feedback control is performed with regard to the boosting section 34 for the value of the post-boosting voltage V2 to be maintained during a time interval D where the post-boosting voltage V2 which is approximately "246 V" is continually output. In addition, the input side detecting section 33 also performs an operation of detecting at each passing of a predetermined period of time and these detection results are utilized by the CPU 43 for monitoring of whether or not there is variation in the power source voltage V0. Due to this, heat generated by the various types of electrical components which configure the boosting section 34 is suppressed since it is not necessary for surplus energy to be accumulated in the boosting section 34.

Here, the target value association information Inf1 which is represented by equation 1 is determined in consideration of the range of operations of the inverter 38 and the range which is equal to or less than the respective standard voltages of the smoothing capacitor 36 and the transistor Q38a to Q38f as described above. For this reason, it is obvious that each of the values of "191 V", "215 V", "246 V", and "259V" for the post-boosting voltage V2 which is output from the boosting section 34 in the respective time intervals A to D in FIG. 6 are values which are within the range of operations of the inverter 38 and are equal to or less than the respective standard voltages of the smoothing capacitor 36 and the transistor Q38a to Q38f.

Here, as the timing when the CPU 43 according to the present embodiment performs an operation of determining the boosting target value Tp, there are the examples of while the compressor motor M12 is actually being driven or before activation of the compressor motor M12 in the same manner as the timing for detecting by each of the detecting sections 33 and 35. That is, when the compressor motor M12 is activated, the boosting section 34 performs an operation where the post-rectifying voltage V1 is boosted based on the boosting target value Tp which is determined according to the power source variation information Vf1 immediately before activation. After activation of the compressor motor M12, the boosting section 34 performs an operation where the post-rectifying voltage V1 is boosted based on the boosting target value Tp which is determined according to the power source variation information Vf1 which is detected at each passing of a predetermined period of time.

(3) Operations

The operations which are performed by the motor driving apparatus 30 according to the present embodiment will be described next using FIG. 7 particularly focusing on the operation of boosting by the boosting section 34.

Step S1: in a case where there is a command to start driving of the air conditioner 10 via a remote controller or the like, the CPU 43 of the motor driving apparatus 30 ascertains that there is a command to activate the compressor motor M12 (Yes in S1). In a case where there is yet to be a command to start driving of the air conditioner 10 (No in S1), the CPU 43 and the drive voltage output section 37 in the motor driving apparatus 30 maintain a state where driving of the compressor motor M12 is stopped.

Step S2 and S3: before the compressor motor M12 is actually activated, the input side detecting section 33 performs detecting of the power source variation information Vf1, that is, the value of the post-rectifying voltage V1 which is the input voltage with regard to the boosting section 34 (S2). Then, the CPU 43 determines the boosting target value Tp for the boosting section 34 inside the motor driving apparatus 30 based on the power source variation information Vf1 which is detected in step S2 and the target value association information Inf1 which is determined in advance based on the range of operations of the inverter 38 and the like (S3).

Step S4: after step S3, the CPU 43 and the drive voltage output section 37 actually start activating the compressor motor M12.

Step S5: immediately after activation of the compressor motor M12 is started, the input side detecting section 33 detects the power source variation information Vf1 at each passing of a predetermined period of time and the CPU 43 performs monitoring of the power source variation information Vf1. In addition, the CPU 43 also performs calculation of the boosting internal current at each passing of a predetermined period of time. The output side detecting section 35 performs detecting of the post-boosting voltage V2 at each passing of a predetermined period of time. The CPU 43 performs feedback control with regard to the operation of boosting by the boosting section 34 using the post-boosting voltage V2 and the boosting internal current at each passing of a predetermined period of time as long as the power source voltage V0 does not vary.

Step S6 and S7: in a case where the CPU 43 ascertains that there is variation in the power source voltage V0 from the power source variation information Vf1 which is being monitored (Yes in S6), the boosting target value Tp is modified based on the power source variation information Vf1 at the current point in time and the target value association information Inf1 in the memory 42 (S7). Here, in a case where it is not ascertained in step S6 that there is variation in the power source voltage V0 (No in S6), the motor driving apparatus 30 does not perform the operation in step S7.

Step S8: after step S7 or in a case where there is no variation in the power source voltage V0 in step S6 (No in S6), the motor driving apparatus 30 repeats the operations from step S5 until there is a command to stop driving of the air conditioner 10 via a remote controller or the like (No in S8). In a case where there is a command to stop driving of the air conditioner 10 (Yes in S8), the motor driving apparatus 30 completes this series of operations.

(4) Characteristics 4-1

Using the motor driving apparatus 30 according to the present embodiment, when the post-rectifying voltage V1 which is the rectified power source voltage V0 is input into the boosting section 34 as the input voltage, the post-boosting voltage V2 is generated due to the post-rectifying voltage V1 being boosted by the boosting section 34. The post-boosting voltage V2 is supplied to the inverter 38 in the drive voltage output section 37. The input side detecting section 33 detects the value of the post-rectifying voltage V1 as the power source variation information Vf1 in a case where there is power source variation. The target value association information Inf1 which associates the boosting target value Tp and the power source variation information Vf1 is stored in the memory 42.

Then, the CPU 43 determines the boosting target value Tp based on the target value association information Inf1 and the power source variation information Vf1 for each point in time. In particular, the target value association information Inf1 is determined based on the range of operations of the drive voltage output section 37 (in detail, the inverter 38) so that the boosting target value Tp is within this range of operations. For this reason, it is possible for the value of the post-boosting voltage V2 which is output from the boosting section 34 to be a value which is within the range of operations of the inverter 38. Due to this, it is possible for the amount of boosting of the voltage using the boosting section 34 to be suppressed to an appropriate amount while ensuring that it is possible for the inverter 38 to be reliably operated even when there is variation in the power source voltage V0. That is, without using larger components as the components which configure the boosting section 34, it is possible to suppress the amount of heating generated in the components (for example, the coils L34a to 34c and transistors Q34a to 34c) when variation in the power source voltage V0 is generated. Accordingly, it is possible to achieve components which are smaller in size.

4-2

Furthermore, in the present embodiment, the target value association information Inf1 is determined so as to satisfy not only the range of operations of the drive voltage output section 37 but also the condition that the boosting target value Tp is equal to or less than the standard voltages of electrical components which configure the motor driving apparatus 30.

Accordingly, the voltage which is applied to the electrical components is suppressed to be equal to or less than the standard voltage even if there is variation in the power source voltage V0 and whatever the value of the boosting target value Tp. Accordingly, it is possible to prevent faults in the electrical components.

4-3

As described above, in the motor driving apparatus 30 according to the present embodiment, the boosting target value Tp is determined according to the power source variation information Vf1. With this, the post-boosting voltage V2 which is generated by the boosting section 34 increases and the voltage endurance of a functional section (in detail, the smoothing capacitor 36 and the drive voltage output section 37), which is positioned on a latter stage side of the boosting section 34, where the post-boosting voltage V2 is to be applied, is a problem depending on the case.

However, in the present embodiment, the boosting target value Tp is determined to be equal to or less than the respective standard voltages of the smoothing capacitor 36 and the transistors Q38a to Q38f inside the drive voltage output section 37 which are positioned on a latter stage side of the boosting section 34. Accordingly, it is possible to reliably prevent faults in the smoothing capacitor 36 and the transistors Q38a to Q38f even if the value of the post-boosting voltage V2 changes due to changes in the boosting target value Tp according to variation in the power source voltage V0.

4-4

In addition, in the present embodiment, the operation of detecting the power source variation information Vf1 using the input side detecting section 33 and the operation of determining the boosting target value Tp using the CPU 43 is performed before starting driving of the compressor motor M12, that is, before activation of the compressor motor M12.

Due to this, the post-boosting voltage Tp which is determined based on the power source variation information Vf1 before activation of the compressor motor M12 is a voltage value which is to be achieved by boosting using the boosting section 34 in practice when activation of the compressor motor M12 is started. Accordingly, the post-boosting voltage V2 which has a value which is determined before activation of the compressor motor M12 is supplied to the inverter 38 in the drive voltage output section 37.

4-5

Furthermore, in the present embodiment, the operation of detecting the power source variation information Vf1 using the input side detecting section 33 and the operation of determining the boosting target value Tp using the CPU 43 is also performed while the compressor motor M12 is being driven.

Due to this, the boosting target value Tp is determined according to the power source variation information Vf1 for each point in time after activation of the compressor motor M12. Consequently, the voltage value which is to be achieved by boosting using the boosting section 34 is a value which corresponds to real time variation in the power source voltage V0 and the post-boosting voltage V2 which has this value is supplied to the inverter 38 in the drive voltage output section 37. Accordingly, it is possible to more reliably ensure that it is possible for the inverter 38 in the drive voltage output section 37 to be operated. And, it is also possible to more reliably suppress the amount of heating generated in the components which configure the boosting section 34 since it is possible for the amount of boosting of the voltage using the boosting section 34 to be suppressed to a more appropriate amount.

4-6

In particular, the CPU 43 according to the present embodiment changes the boosting target value Tp according to the power source variation information Vf1.

Due to this, the post-boosting voltage V2, which has a value which changes according to the power source variation information Vf1, is supplied to the inverter 38 in the drive voltage output section 37. Accordingly, it is possible to more reliably ensure that it is possible for the inverter 38 in the drive voltage output section 37 to be operated. And, it is also possible to more reliably suppress the amount of heating generated in the components which configure the boosting section 34 since it is possible for the amount of boosting of the voltage using the boosting section 34 to be suppressed to a more appropriate amount.

4-7

In particular, the power source variation information Vf1 and the boosting target value Tp are associated in the target value association information Inf1 according to the present embodiment so that the boosting target value Tp increases in units which are a predetermined value in accompaniment with increases in the value of the power source voltage V0 (in more detail, the value of the post-rectifying voltage V1) as shown in FIG. 5 and equation (1).

That is, in the present embodiment, the boosting target value Tp becomes higher as the power source variation information Vf1 is higher and the boosting target value Tp becomes lower as the power source variation information Vf1 is smaller. Accordingly, it is possible to reliably prevent, for example, the current which flows in the components which configure the boosting section from being large and consequently the amount of heat generated in the components which configure the boosting section from becoming large due to the boosting target value being high while the value of the power source voltage is low and the power source variation information Vf1 is small.

(5) Modified Examples (5-1) Modified Example A

The embodiment described above is described as a case where the power source variation information Vf1 is the value of the input voltage to the boosting section 34, that is, the value of the post-rectifying voltage V1. However, the power source variation information Vf1 may be a variation width ΔV with regard to the reference value for the post-rectifying voltage V1 which is the input voltage instead of the value of the post-rectifying voltage V1. Here, as the reference value for the post-rectifying voltage V1, there are the examples of the value of the post-rectifying voltage V1 when the power source is introduced to a motor driving apparatus 130, the value of the post-rectifying voltage V1 when applying the standard voltage value for the commercial power source 91 in the area where the air conditioner 10 is installed, and the like.

In this case, although not shown in the diagrams, it is preferable that the input side detecting section 33 be realized also using the controller 41 which has the memory 42 and the CPU 43 as well as the resistors 33a and 33b in FIG. 1 and the capacitor, the peak hold circuit, and the AD converter as that it is possible to detect the variation width ΔV described above. That is, the configuration of the input side detecting section 33 is roughly divided into two with the configuration from the resistors 33a and 33b to the AD converter and the configuration using the controller 41. In this case, the value of the post-rectifying voltage V1 which is the input voltage is detected using the former configuration. The variation width ΔV is detected based on the value of the post-rectifying voltage V1 and the reference value which is stored in advance using the latter configuration.

Here, in this case, the content of the power source variation information Vf1 is different to the embodiment described above, but the details of the target value association information Inf1, the method for determining the boosting target value Tp, and the like are the same as the embodiment described above. Accordingly, a detail description is omitted.

(5-2) Modified Example B

The embodiment described above is described as a case where the power source variation information Vf1 and the boosting target value Tp are associated so that the boosting target value Tp changes in a linear manner in accompaniment with increases in the power source voltage V0 as shown by the target value association information Inf1 in FIG. 5 and equation (1).

However, in the motor driving apparatus according to the present invention, the post-boosting voltage V2, which is the output of the boosting section 34, need not be constant and may change according to changes in the power source variation information Vf1. For this reason, the target value association information of the present invention is not limited to FIG. 5 and equation (1).

Figure 8:
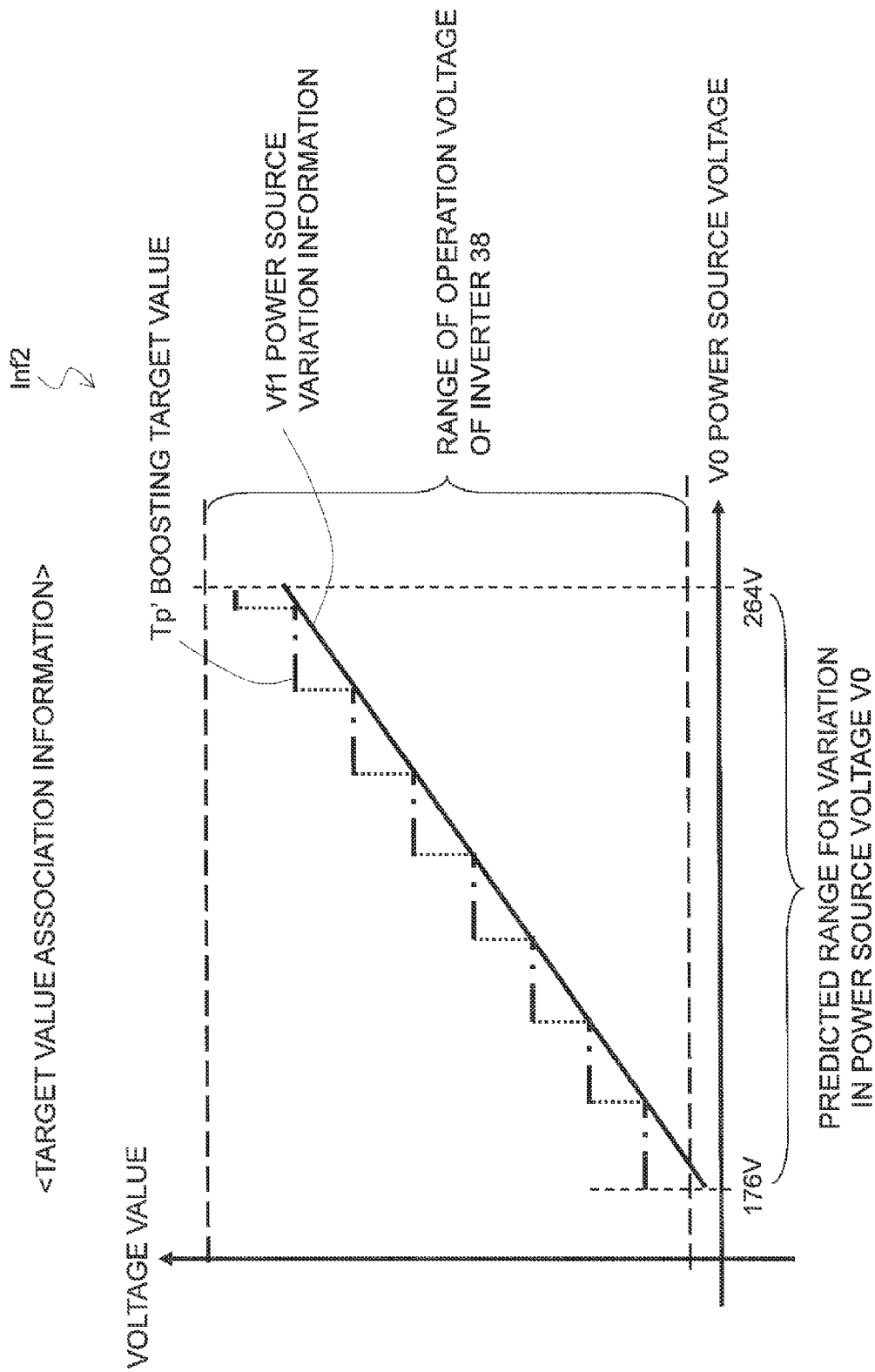
FIG. 8 is a diagram for explaining the concept of target value association information according to modified example B.

As another example of the target value association information, there is an example of, target value association information Inf2 which is shown in FIG. 8. How a boosting target value Tp' changes along with changes in the power source variation information Vf1 is represented in FIG. 8 with the power source voltage V0 adopted as the horizontal axis and the voltage value adopted as the vertical axis. In FIG. 8, the boosting target value Tp' does not change in a linear manner and changes in steps according to changes in the value of the power source voltage V0 and the power source variation information Vf1. In detail, the boosting target value Tp' has the same value if the value of the power source voltage V0 and the power source variation information Vf1 are in predetermined ranges and the value of the boosting target value Tp' changes if the value of the power source voltage V0 and the power source variation information Vf1 surpass the predetermined ranges.

Here, when looking at the entirety of the target value association information Inf2 which is shown in FIG. 8, the points, where there is a tendency for the boosting target value Tp' to adopt a smaller value as the value of the power source voltage V0 and the power source variation information Vf1 are smaller and there is a tendency for the boosting target value Tp' to adopt a larger value as the value of the power source voltage V0 and the power source variation information Vf1 are larger, are shared with FIG. 5 according to the embodiment described above.

In this manner, the power source variation information Vf1 and the boosting target value Tp' may be associated in the target value association information Inf2 so that the boosting target value Tp' changes in steps according to the value of the power source voltage V0 and the power source variation information Vf1. Even in this case, the target value association information Inf2 is determined based on at least the range of operations of the inverter 38 as shown in FIG. 8. That is, the boosting target value Tp' is always within the range of operations of the inverter 38 even if the boosting target value Tp' changes. Accordingly, it is possible to prevent heat generated in components such as the coils L34a to L34c which configure the boosting section 34 and to operate the inverter 38 without any problems.

In addition, the target value association information Inf2 may be determined in consideration of not only the range of operations of the inverter 38 but also a condition where the boost target value Tp' is equal to or less than the respective standard voltages of the smoothing capacitor 36 and the transistors Q38a to Q38f in the same manner as the target value association information Inf1 according to the embodiment described above.

Here, it is preferable that the width of the boosting target value Tp' which changes in steps in the predetermined range described above be appropriately determined using desktop calculations, simulations, experimentation, and the like based on the range of operations of the inverter 38 and the range over which variation in the power source voltage V0 is predicted in the same manner as the constant Vα according to the embodiment described above. Furthermore, it is even more preferable that the width of the boosting target value Tp' which changes in steps in the predetermined range described above be appropriately determined using desktop calculations and the like based on a range where the boosting target value Tp' is equal to or less than the respective standard voltages of the smoothing capacitor 36 and the transistors Q38a to Q38f.

Here, it is possible to state that modified example B is the same not only cases where the power source variation information Vf1 is the value of the post-rectifying voltage V1 but also cases where the power source variation information Vf1 is the variation width ΔV with regard to the reference value for the post-rectifying voltage V1.

(5-3) Modified Example C

The embodiment described above is described as a case where the boosting target value Tp is obtained by adding the constant Vα to the power source variation information Vf1 at each point in time as shown by the target value association information Inf1 in FIG. 5 and equation (1).

However, "Vα" which is the target for adding to the power source variation information Vf1 need not be a constant. "Vα" may be a value which appropriately changes according to the power source variation information Vf1.

Here, it is possible to state that modified example C is the same not only cases where the power source variation information Vf1 is the value of the post-rectifying voltage V1 but also cases where the power source variation information Vf1 is the variation width ΔV with regard to the reference value for the post-rectifying voltage V1.

(5-4) Modified Example D

Figure 7:
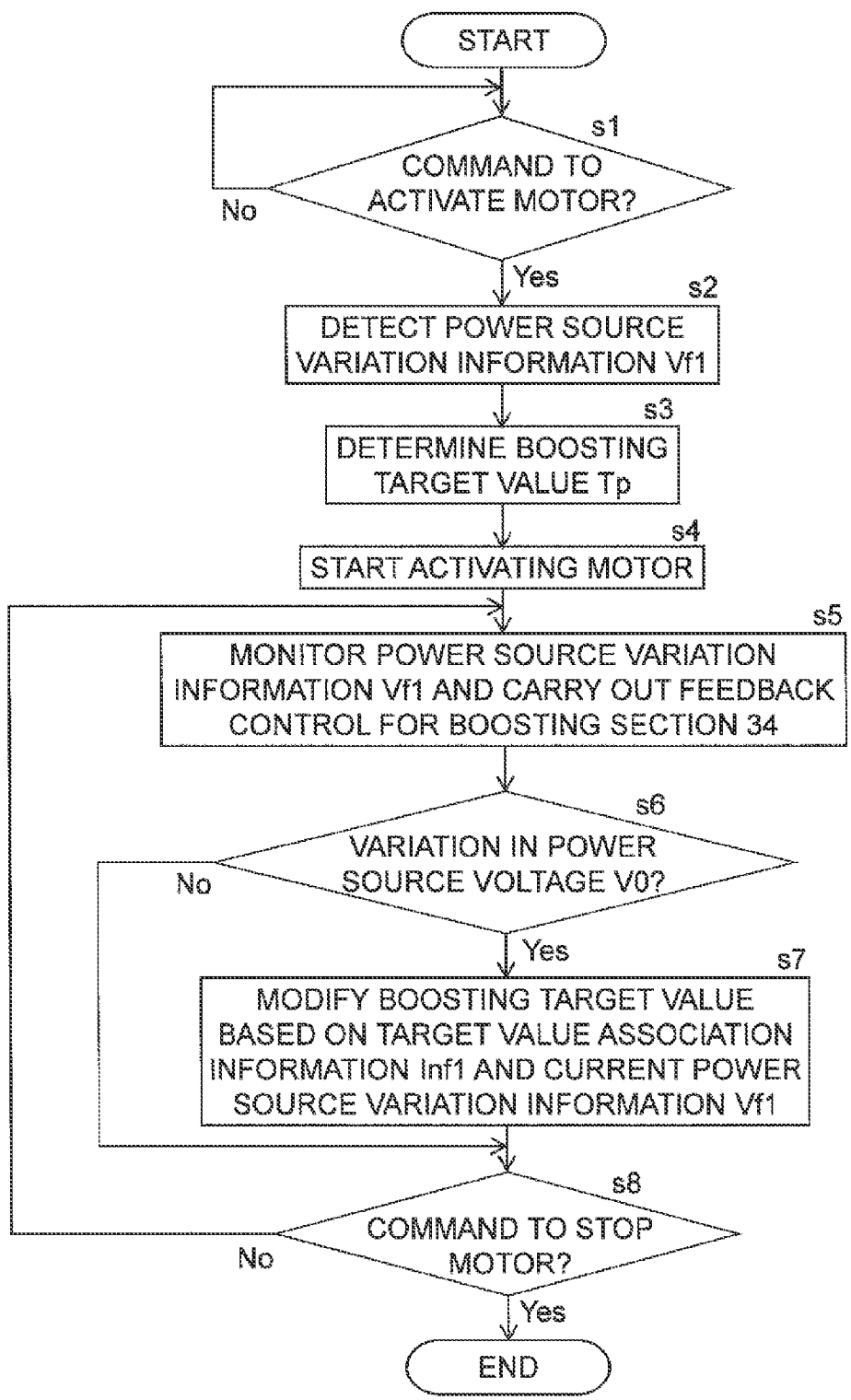
FIG. 7 is a diagram representing a flow of operations of the motor driving apparatus according to an embodiment.

The embodiment described above is described with the operation of detecting the power source variation information Vf1 using the input side detecting section 33 and the operation of determining the boosting target value Tp using the CPU 43 as being performed both before activation and during driving of the compressor motor M12 as shown in FIG. 7.

However, the operation of detecting the power source variation information Vf1 using the input side detecting section 33 and the operation of determining the boosting target value Tp using the CPU 43 may be performed only before activation of the compressor motor M12 without being performed during driving of the compressor motor M12.

Figure 9:
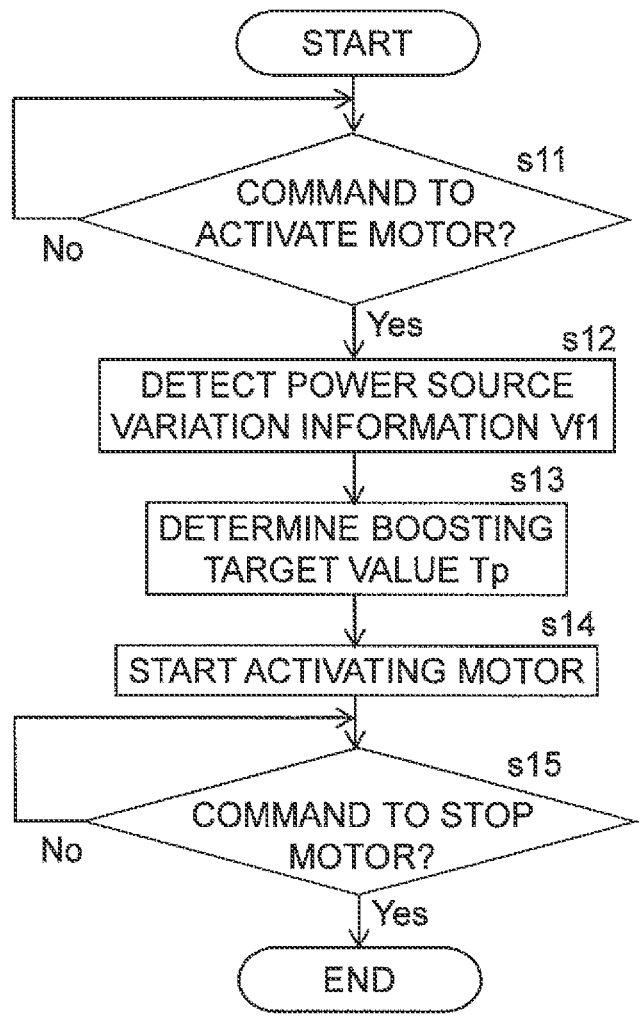
FIG. 9 is a diagram representing a flow of operations of the motor driving apparatus according to modified example D.

Operations of the motor driving apparatus 30 in this case are shown in FIG. 9.

Step S11: in a case where there is a command to start driving of the air conditioner 10 via a remote controller or the like, the CPU 43 of the motor driving apparatus 30 ascertains that there is a command to activate the compressor motor M12 (Yes in S1). In a case where there is yet to be a command to start driving of the air conditioner 10 (No in S1), the CPU 43 and the drive voltage output section 37 in the motor driving apparatus 30 maintain a state where driving of the compressor motor M12 is stopped.

Step S12 and S13: before the compressor motor M12 is actually activated, the input side detecting section 33 performs detecting of the power source variation information Vf1 (S12). Then, the CPU 43 determines the boosting target value Tp for the boosting section 34 inside the motor driving apparatus 30 based on the power source variation information Vf1 which is detected in step S12 and the target value association information Inf1 which is determined in advance based on the range of operations of the inverter 38 and the like (S13).

Step S14: after step S13, the CPU 43 and the drive voltage output section 37 actually start activating the compressor motor M12. During driving of the compressor motor M12, the boosting section 34 outputs the post-boosting voltage V2 which has the boost target value Tp which is determined in step S13. In addition, the CPU 43 performs calculation of the boosting internal current at each passing of a predetermined period of time, and the output side detecting section 35 performs detecting of the post-boosting voltage V2 at each passing of a predetermined period of time. The CPU 43 performs feedback control with regard to the operation of boosting by the boosting section 34 using the post-boosting voltage V2 and the boosting internal current at each passing of a predetermined period of time.

Step S15: the motor driving apparatus 30 drives the compressor motor M12 until there is a command to stop driving of the air conditioner 10 via a remote controller or the like (No in S15). In a case where there is a command to stop driving of the air conditioner 10 (Yes in S15), the motor driving apparatus 30 completes this series of operations.

That is, the operations of S5 to S7 in FIG. 7 are not performed in the case of modified example D as described above.

Due to this, the input side detecting section 33 need not be operated at least during driving of the compressor motor M12. Accordingly, it is possible to suppress current consumption over the entirety of the motor driving apparatus 30 in the case of modified example D in comparison to the case of the embodiment described above.

Here, the boosting target value Tp according to modified example D may be determined based on the target value association information Inf1 of the embodiment described above which is shown in FIG. 5 or may be determined based on the target value association information Inf2 of modified example A described above which is shown in FIG. 8.

Here, it is possible to state that modified example D is the same not only cases where the power source variation information Vf1 is the value of the post-rectifying voltage V1 but also cases where the power source variation information Vf1 is the variation width ΔV with regard to the reference value for the post-rectifying voltage V1.

(5-5) Modified Example E

In contrast to this, the operation of detecting the power source variation information Vf1 using the input side detecting section 33 and the operation of determining the boosting target value Tp using the CPU 43 may be performed only during driving of the compressor motor M12 without being performed before activation of the compressor motor M12.

Figure 10:
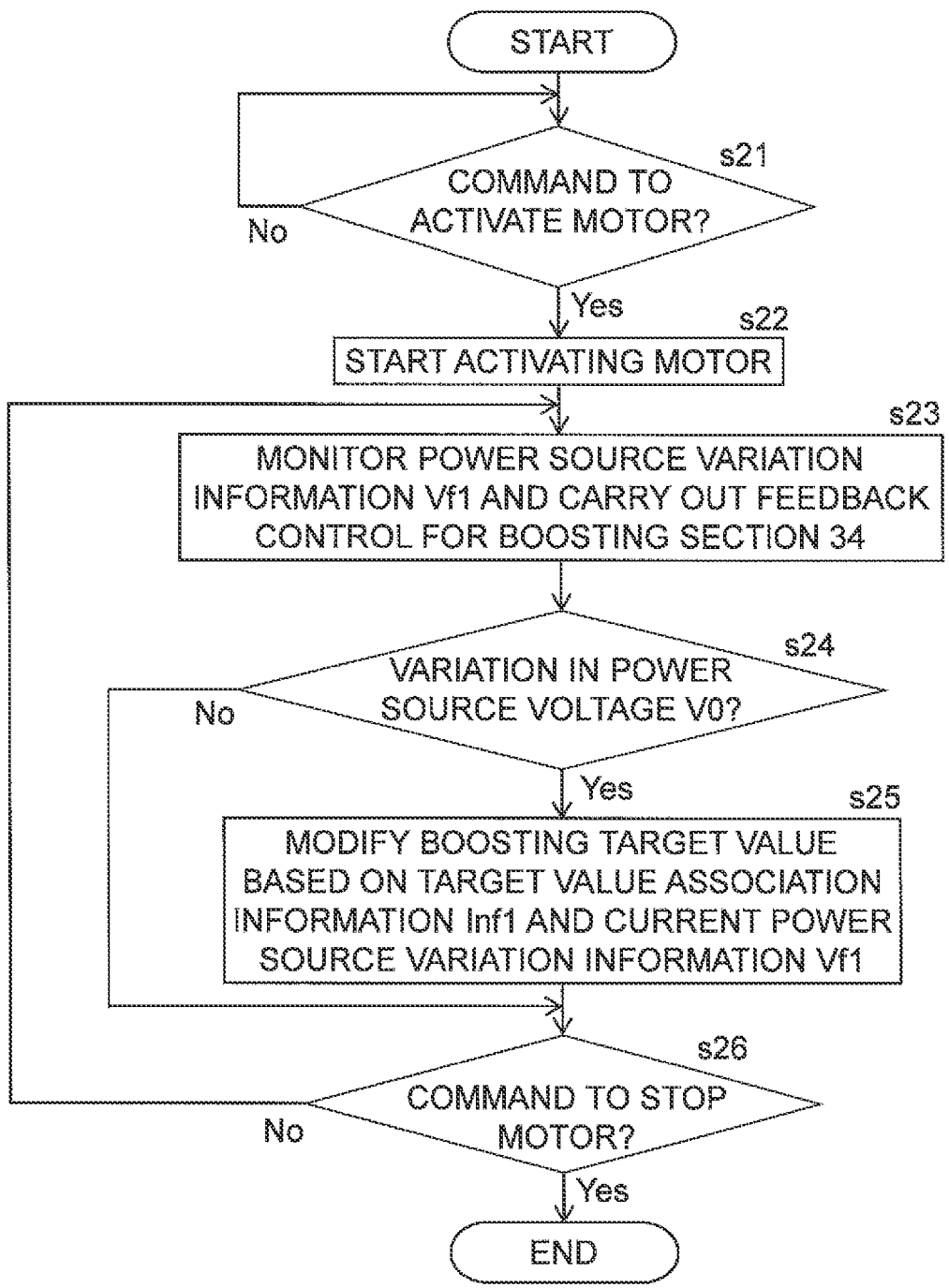
FIG. 10 is a diagram representing a flow of operations of the motor driving apparatus according to modified example E.

Operations of the motor driving apparatus 30 in this case are shown in FIG. 10.

Step S21: in a case where there is a command to start driving of the air conditioner 10 via a remote controller or the like, the CPU 43 of the motor driving apparatus 30 ascertains that there is a command to activate the compressor motor M12 (Yes in S21). In a case where there is yet to be a command to start driving of the air conditioner 10 (No in S21), the CPU 43 and the drive voltage output section 37 in the motor driving apparatus 30 maintain a state where driving of the compressor motor M12 is stopped.

Step S22: the CPU 43 and the drive voltage output section 37 actually start activating the compressor motor M12. Here, an initial value which is determined in advance is used as the boosting target value Tp in this case.

Step S23: immediately after activation of the compressor motor M12 is started, the input side detecting section 33 detects the power source variation information Vf1 at each passing of a predetermined period of time and the CPU 43 performs monitoring of the power source variation information Vf1. In addition, the CPU 43 also performs calculation of the boosting internal current at each passing of a predetermined period of time. The output side detecting section 35 performs detecting of the post-boosting voltage V2 at each passing of a predetermined period of time. The CPU 43 performs feedback control with regard to the operation of boosting by the boosting section 34 using the post-boosting voltage V2 and the boosting internal current at each passing of a predetermined period of time as long as the power source voltage V0 does not vary.

Step S24 and S25: in a case where the CPU 43 ascertains that there is variation in the power source voltage V0 from the power source variation information Vf1 which is being monitored (Yes in S24), the boosting target value Tp is modified based on the power source variation information Vf1 at the current point in time and the target value association information Inf1 in the memory 42 (S25). Here, in a case where it is not ascertained in step S24 that there is variation in the power source voltage V0 (No in S24), the motor driving apparatus 30 does not perform the operation in step S25.

Step S26: after step S25 or in a case where there is no variation in the power source voltage V0 (No in S24) in step S24, the motor driving apparatus 30 repeats the operations from step S23 until there is a command to stop driving of the air conditioner 10 via a remote controller or the like (No in S26). In a case where there is a command to stop driving of the air conditioner 10 (Yes in S26), the motor driving apparatus 30 completes this series of operations.

That is, the operations of S2 and S3 in FIG. 7 are not performed in the case of modified example E as described above.

Due to this, the voltage value which is to be achieved by boosting using the boosting section 34 is a value according to real time variation in the power source voltage V0 and is supplied to the inverter 38 even if in a case where there is variation in the power source voltage V0 during driving of the compressor motor M12. Accordingly, it is possible to more reliably ensure that it is possible for the inverter 38 to be operated. And, it is also possible to more reliably suppress the amount of heating generated in components which configure the boosting section 34 since it is possible for the amount of boosting of the voltage using the boosting section 34 to be suppressed to a more appropriate amount.

Here, the boosting target value Tp according to modified example E may be determined based on the target value association information Inf1 of the embodiment described above which is shown in FIG. 5 or may be determined based on the target value association information Inf2 of modified example A described above which is shown in FIG. 8.

Here, it is possible to state that modified example E is the same not only cases where the power source variation information Vf1 is the value of the post-rectifying voltage V1 but also cases where the power source variation information Vf1 is the variation width ΔV with regard to the reference value for the post-rectifying voltage V1.

(5-6) Modified Example F

Furthermore, the timing when the input side detecting section 33 performs an operation of detecting the power source variation information Vf1 may be associated with the operation of boosting using the boosting section 34 in the present invention.

For example, the input side detecting section 33 may perform an operation of detecting the power source variation information Vf1 immediately before an operation of boosting using the boosting section 34 is started. Alternatively, the input side detecting section 33 may perform an operation of detecting the power source variation information Vf1 while an operation of boosting using the boosting section 34 is being performed. Alternatively, the input side detecting section 33 may perform an operation of detecting the power source variation information Vf1 from immediately before the boosting section 34 performs the operation of boosting until immediately after the operation of boosting is completed and the input side detecting section 33 may perform an operation of detecting the power source variation information Vf1 while an operation of boosting is being performed.

In addition, the input side detecting section 33 may perform an operation of detecting the power source variation information Vf1 from when the power source is introduced into the motor driving apparatus 30 until driving of the compressor motor M12 is completed.

Here, it is possible to state that modified example F is the same not only cases where the power source variation information Vf1 is the value of the post-rectifying voltage V1 but also cases where the power source variation information Vf1 is the variation width ΔV with regard to the reference value for the post-rectifying voltage V1.

(5-7) Modified Example G

The embodiment described above is described with the boosting section 34 being connected at a stage after the rectifying section 32 as shown in FIG. 1.

However, the rectifying section 32 need not be provided. In this case, the input voltage to the boosting section 34 is the power source voltage V0 without any changes.

In addition, a case where the filter 31 is provided before the rectifying section 32 is described in FIG. 1. However, the filter 31 need not be provided.

Here, it is possible to state that modified example G is the same not only cases where the power source variation information Vf1 is the value of the post-rectifying voltage V1 but also cases where the power source variation information Vf1 is the variation width ΔV with regard to the reference value for the post-rectifying voltage V1.

(5-8) Modified Example H

The embodiment described above is described as a case where the input side detecting section 33 is positioned at a stage after the rectifying section 32 as shown in FIG. 1.

However, it is sufficient if it is possible for the input side detecting section 33 to detect the input voltage which is input into the boosting section 34 and the position of the input side detecting section 33 is not limited to the position which is shown in FIG. 1. In a case where, for example, a rectifying circuit is separately at a stage before the rectifying section 32, an input side detecting section may be provided at the output of this circuit.

Here, it is possible to state that modified example H is the same not only cases where the power source variation information Vf1 is the value of the post-rectifying voltage V1 but also cases where the power source variation information Vf1 is the variation width ΔV with regard to the reference value for the post-rectifying voltage V1.

(5-9) Modified Example I

The embodiment described above is described with the resistors R34a to R34c which configure the boosting section 34 as shunt resistors which are for detecting current which flows in the transistors Q34a to Q34c.

However, the boosting section 34 may be provided with a current sensor instead of the resistors R34a to R34c.

Here, it is possible to state that modified example I is the same not only cases where the power source variation information Vf1 is the value of the post-rectifying voltage V1 but also cases where the power source variation information Vf1 is the variation width ΔV with regard to the reference value for the post-rectifying voltage V1.

(5-10) Modified Example J

The embodiment described above is described with the controller 41 performing control of the drive voltage output section 37 and control of the boosting section 34.

However, a control section which performs control of the drive voltage output section 37 and a section which performs control of the boosting section 34 may be configured using separate CPUs or ICs.

Here, it is possible to state that modified example J is the same not only cases where the power source variation information Vf1 is the value of the post-rectifying voltage V1 but also cases where the power source variation information Vf1 is the variation width ΔV with regard to the reference value for the post-rectifying voltage V1.

(5-11) Modified Example K

The embodiment described above is described with the constant Vα which is shown in equation (1) being determined according to at least the range of operation of the inverter 38, the range over which variation in the power source voltage V0 is predicted, and the like.

However, at least one of an upper limit value or a lower limit value of the boosting target value Tp itself may be determined according to the range of operations of the inverter 38 and the like instead of the constant Vα being determined according to the range of operations of the inverter 38 and the like. Alternatively, at least one of an upper limit value or a lower limit value of the boosting target value Tp itself may be determined along with the constant Vα being determined according to the range of operations of the inverter 38 and the like.

In addition, in the embodiment described above, the post-boosting voltage V2 which is applied to the inverter 38 in the drive voltage output section 37 changes due to changes in the boosting target value Tp according to the post-rectifying voltage V1 which is the input voltage. However, the post-boosting voltage V2 which is applied to the inverter 38 may change due to changes in the boosting target value Tp according to the load on the inverter 38 itself. Here, in this case, the upper limit value and the lower limit value of the boosting target value Tp is provided in advance to be within the range of operations of the inverter 38 and in a range where the boosting section 34 normally operates.

Due to this, the post-boosting voltage V2 which is applied to the inverter 38 in the drive voltage output section 37 is reliably within the range of operations of the inverter 38 even if there is variation in the power source voltage V0.

Here, it is possible to state that modified example K is the same not only cases where the power source variation information Vf1 is the value of the post-rectifying voltage V1 but also cases where the power source variation information Vf1 is the variation width ΔV with regard to the reference value for the post-rectifying voltage V1.

(5-12) Modified Example L

The embodiment described above is described with the target value association information Inf1 being determined based on the range of operation of the inverter 38 and the condition that the boosting target voltage Tp is equal to or less than the respective standard voltages of the smoothing capacitor 36 and the transistors Q38a to Q38f.

However, it is sufficient if the target value association information Inf1 is determined based on at least the range of operation of the inverter 38. Accordingly, the target value association information Inf1 need not necessarily be determined in consideration of the condition that the boosting target voltage Tp is equal to or less than the respective standard voltages of the smoothing capacitor 36 and the transistors Q38a to Q38f.

In addition, as the electrical components which are the targets for consideration with regard to the standard voltages in the embodiment described above, there are the examples of the configuration components of the functional section which is positioned at a stage after the boosting section 34 (that is, the smoothing capacitor 36 and the transistors Q38a to Q38f). However, the electrical components which are the targets for consideration with regard to the standard voltages may be components other than the smoothing capacitor 36 and the transistors Q38a to Q38f and may be either one of the smoothing capacitor 36 or the transistors Q38a to Q38f. In addition, electrical components which are positioned at a stage before the boosting section 34 may be further included as the electrical components which are the targets for consideration with regard to the standard voltages.

Here, it is possible to state that modified example L is the same not only cases where the power source variation information Vf1 is the value of the post-rectifying voltage V but also cases where the power source variation information Vf1 is the variation width ΔV with regard to the reference value for the post-rectifying voltage V1.

(5-13) Modified Example M

All of the capacitors which are shown in the embodiment described above are not limited to smoothing capacitors or electrolytic capacitors.

(5-14) Modified Example N

The embodiment described above is described as a case where the target for driving by the motor driving apparatus 30 is the compressor motor M12. However, the target for driving by the motor driving apparatus 30 is not limited to the compressor motor M12. As another example of the target for driving, there is the example of a fan motor.

Here, it is possible to state that modified example M is the same not only cases where the power source variation information Vf1 is the value of the post-rectifying voltage V1 but also cases where the power source variation information Vf1 is the variation width ΔV with regard to the reference value for the post-rectifying voltage V1.

What is claimed is:

1. A motor driving apparatus comprising:
    a boosting section applied with a voltage relating to a power source voltage as an input voltage and generating a post-boosting voltage by boosting the input voltage, the boosting section including a switch and a resistor connected to the switch in series;
    a drive voltage output section generating a drive voltage to drive a motor using the post-boosting voltage and outputting the drive voltage to the motor;
    a power source variation information detecting section detecting a value of the input voltage or a variation width relative to a reference value of the input voltage as variation power source variation information in a case when there is power source variation;
    an output side detecting section detecting the post-boosting voltage generated by the boosting section;
    a storage section storing target value association information associating the power source variation information and a boosting target value, the boosting target value being a target value of the post-boosting voltage generated by the boosting section; and
    a determining section determining the boosting target value based on the power source variation information detected and the target value association information, the target value association information being determined based on a range of operations of the drive voltage output section, the determining section performing control to the boosting section using a value of a boosting internal current of the boosting section and a value of the post-boosting voltage, the post-boosting voltage being adjusted based on detection results of the output side detecting section, and the determining section calculating the value of the boosting internal current of the boosting section based on a resistance value of the resistor and values of voltages at both ends of the resistor, the boosting internal current of the boosting section being used to determine a current through the switch.

2. The motor driving apparatus according to claim 1, wherein the target value association information is also determined based on a condition that the boosting target value is equal to or less than a standard voltage of electrical components of the motor driving apparatus.

3. The motor driving apparatus according to claim 2, further compromising:

a smoothing capacitor positioned on an output side of the boosting section and an input side of the drive voltage output section, the smoothing capacitor smoothing the post-boosting voltage and supplying the post-boosting voltage to the drive voltage output section, the drive voltage output section including a plurality of switching elements, which generate the drive voltage by on and off switching being performed, and at least one of the smoothing capacitor and the switching elements being included in the electrical components.

4. The motor driving apparatus according to claim 1, wherein at least one of an upper limit value and a lower limit value of the boosting target value in the target value association information is determined according to the range of operations of the drive voltage output section.

5. The motor driving apparatus according to claim 1, wherein the power source variation information detecting section detects the power source variation information before driving of the motor is started, and the determining section determines the boosting target value before driving of the motor is started.

6. The motor driving apparatus according to claim 1, wherein the power source variation information detecting section detects the power source variation information while the motor is being driven, and the determining section determines the boosting target value while the motor is being driven.

7. The motor driving apparatus according to claim 1, wherein the determining section changes the boosting target value according to the power source variation information.

8. The motor driving apparatus according to claim 7, wherein the power source variation information and the boosting target value are associated in the target value association information so that the boosting target value increases in units which are a predetermined value in accompaniment with increases in the value of the power source voltage.

9. The motor driving apparatus according to claim 4, wherein the power source variation information detecting section detects the power source variation information before driving of the motor is started, and the determining section determines the boosting target value before driving of the motor is started.

10. The motor driving apparatus according to claim 9, wherein the power source variation information detecting section detects the power source variation information while the motor is being driven, and the determining section determines the boosting target value while the motor is being driven.

11. The motor driving apparatus according to claim 10, wherein the determining section changes the boosting target value according to the power source variation information.

12. The motor driving apparatus according to claim 4, wherein the power source variation information detecting section detects the power source variation information while the motor is being driven, and the determining section determines the boosting target value while the motor is being driven.

13. The motor driving apparatus according to claim 4, wherein the determining section changes the boosting target value according to the power source variation information.

14. The motor driving apparatus according to claim 5, wherein the power source variation information detecting section detects the power source variation information while the motor is being driven, and the determining section determines the boosting target value while the motor is being driven.

15. The motor driving apparatus according to claim 5, wherein the determining section changes the boosting target value according to the power source variation information.

16. The motor driving apparatus according to claim 6, wherein the determining section changes the boosting target value according to the power source variation information.

* * * * *